(12) United States Patent
Asafusa et al.

(10) Patent No.: US 12,527,551 B2
(45) Date of Patent: Jan. 20, 2026

(54) ULTRASOUND DIAGNOSTIC APPARATUS

(71) Applicant: FUJIFILM Corporation, Tokyo (JP)

(72) Inventors: Katsunori Asafusa, Chiba (JP); Tomofumi Nishiura, Chiba (JP); Eiji Kasahara, Chiba (JP); Tomoaki Chono, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 18/437,958

(22) Filed: Feb. 9, 2024

(65) Prior Publication Data

US 2024/0277318 A1   Aug. 22, 2024

(30) Foreign Application Priority Data

Feb. 17, 2023   (JP) ................................. 2023-023532

(51) Int. Cl.
| | | |
|---|---|---|
| *A61B 8/00* | (2006.01) | |
| *A61B 8/08* | (2006.01) | |
| *G06T 7/00* | (2017.01) | |

(52) U.S. Cl.
CPC ............ *A61B 8/5223* (2013.01); *A61B 8/085* (2013.01); *A61B 8/461* (2013.01); *A61B 8/5246* (2013.01);
(Continued)

(58) Field of Classification Search
CPC ....... A61B 8/5223; A61B 8/085; A61B 8/461; A61B 8/5246; G06T 7/0012;
(Continued)

(56) References Cited

U.S. PATENT DOCUMENTS

2006/0052702 A1   3/2006   Matsumura et al.
2016/0262706 A1*  9/2016   Zhao ................... A61B 5/4244
(Continued)

FOREIGN PATENT DOCUMENTS

JP   H06-9563 B2    2/1994
JP   2003-000575 A  1/2003
(Continued)

OTHER PUBLICATIONS

M. Kudo et al., "Response Evaluation Criteria in Cancer of the Liver", Japan Society of Hepatology (2021).
(Continued)

*Primary Examiner* — Chao Sheng
(74) *Attorney, Agent, or Firm* — Paul Teng

(57) ABSTRACT

An ultrasound diagnostic apparatus includes an ultrasound transmission and reception unit that transmits and receives ultrasound waves to and from a subject and that generates a reception signal, an ultrasound information generation unit that generates a plurality of types of ultrasound information based on the reception signal, a detection and measurement unit that detects and measures a lesion based on the plurality of types of ultrasound information, and a lesion/risk information analysis unit that analyzes a state of the lesion based on a measurement result obtained by the detection and measurement unit. The detection and measurement unit includes at least one of a set of a tumorous lesion detection unit and a tumorous lesion measurement unit, a set of a fibrotic lesion detection unit and a fibrotic lesion measurement unit, a set of a calcified lesion detection unit and a calcified lesion measurement unit, or a set of a fatty liver detection unit and a fatty liver measurement unit.

12 Claims, 14 Drawing Sheets

(52) U.S. Cl.
CPC .. *G06T 7/0012* (2013.01); *G06T 2207/10132* (2013.01); *G06T 2207/20081* (2013.01); *G06T 2207/30056* (2013.01); *G06T 2207/30096* (2013.01)

(58) Field of Classification Search
CPC . G06T 2207/10132; G06T 2207/20081; G06T 2207/30056; G06T 7/30096
See application file for complete search history.

(56) References Cited

U.S. PATENT DOCUMENTS

| | | | |
|---|---|---|---|
| 2020/0170624 A1 | 6/2020 | Noguchi et al. | |
| 2020/0187909 A1 | 6/2020 | Yoshikawa | |
| 2022/0254490 A1* | 8/2022 | Addanki | G16H 50/30 |
| 2024/0277311 A1 | 8/2024 | Asafusa et al. | |

FOREIGN PATENT DOCUMENTS

| | | |
|---|---|---|
| JP | 3639364 B2 | 4/2005 |
| JP | 3932482 B2 | 6/2007 |
| JP | 5060141 B2 | 10/2012 |
| JP | 5680703 B2 | 3/2015 |
| JP | 5747377 B2 | 5/2015 |
| JP | 6356528 B2 | 7/2018 |
| JP | 2020-081742 A | 6/2020 |
| JP | 2020-192068 A | 12/2020 |
| JP | 6996035 B2 | 1/2022 |

OTHER PUBLICATIONS

A. Allegretto, "AI helps predict which DCIS patients need to be upstaged" (Jan. 5, 2022) https://www.auntminnie.com/clinical-news/womens-imaging/breast/article/15630142/ai-helps-predict-which-dcis-patients-need-to-be-upstaged.

S. Lee et al., "Radiomics in Breast Imaging from Techniques to Clinical Applications: A Review", Korean J Radiol, 21(7):779-792 (2020).

"Ultrasound Diagnostic Standards for Liver Masses", Jpn J Med Ultrasonics vol. 39 No. 3 (2012).

"Contrast-enhanced ultrasound diagnosis of liver tumors differential diagnosis", Inner Vision (28●3) 2013.

"Ultrasound elastography diagnostic guidelines: Liver", Japanese Society of Ultrasonics in Medicine (2013).

"Abdominal Ultrasound Medical Examination Judgment Manual", Japanese Gastrointestinal Cancer Screening (2021).

'Aiming to realize the ultimate cancer diagnosis support AI "multimodal Ai"', Nikkei Business Publications, Inc. (2021).

* cited by examiner ual diagnosis result based on a diagnostic guideline, a treatment guideline, and experience is derived based on a plurality of types of information obtained from the ultrasound diagnostic apparatus (hereinafter, referred to as ultrasound information). Diagnosis includes the detection of precancerous lesions and non-invasive cancers, and the prediction of their progression to invasive cancer. The diagnostic guideline and the treatment guideline are established by each country or region and indicate evaluation items, determination criteria, and classifications with respect to the lesion.

ULTRASOUND DIAGNOSTIC APPARATUS

CROSS-REFERENCE TO RELATED APPLICATION

The present application claims priority from Japanese Patent Application No. 2023-023532 filed with the Japanese Patent Office on Feb. 17, 2023, the content of which is hereby incorporated by reference into this application.

BACKGROUND OF THE INVENTION

1. Field of the Invention

The present disclosure relates to an ultrasound diagnostic apparatus, and particularly, to an apparatus that analyzes a state of a lesion.

2. Description of the Related Art

The presence or absence of cancer or tumors suspected to be cancerous, and the like have been diagnosed using an ultrasound diagnostic apparatus. In the diagnosis, a comprehensive diagnosis result based on a diagnostic guideline, a treatment guideline, and experience is derived based on a plurality of types of information obtained from the ultrasound diagnostic apparatus (hereinafter, referred to as ultrasound information). Diagnosis includes the detection of precancerous lesions and non-invasive cancers, and the prediction of their progression to invasive cancer. The diagnostic guideline and the treatment guideline are established by each country or region and indicate evaluation items, determination criteria, and classifications with respect to the lesion.

JP2003-575A describes an image diagnosis support system that processes a plurality of pieces of data of a site to be examined of a subject imaged by different imaging apparatuses and that generates determination data for benignity or malignancy of the site to be examined. JP2020-192068A describes an image diagnosis support apparatus that discriminates diseases based on a plurality of types of measured values at a plurality of positions within a living body. Masatoshi Kudo et al., "Response Evaluation Criteria in Cancer of the Liver (6th Edition) (Revised Edition in 2021)", Liver, Vol. 62, No. 12, pp. 823 to 829 discloses criteria for determining a treatment effect of liver cancer.

SUMMARY OF THE INVENTION

In the conventional diagnosis using an ultrasound diagnostic apparatus, it is necessary to detect pathological changes in biological tissues, anatomical characteristic changes, and the like (hereinafter, referred to as a lesion) from within a vast amount of medical information, and an effort required to obtain a diagnosis result is substantial. In addition, there are cases where making an objective judgment about similar feature changes may be difficult.

An object of the present disclosure is to reduce an effort required to obtain a diagnosis result for a lesion, and to enhance objectivity of the diagnosis result, to provide diagnostic support.

According to the present disclosure, there is provided an ultrasound diagnostic apparatus comprising: an ultrasound transmission and reception unit that transmits and receives ultrasound waves to and from a subject and generates a reception signal; an ultrasound information generation unit that generates a plurality of types of ultrasound information based on the reception signal; a detection and measurement unit that detects and measures a lesion based on the plurality of types of ultrasound information; and an analysis unit that analyzes a state of the lesion based on a measurement result obtained by the detection and measurement unit.

In one embodiment, the detection and measurement unit includes at least one of a tumorous lesion detection and measurement unit that detects and measures a tumorous lesion, a fibrotic lesion detection and measurement unit that detects and measures a fibrotic lesion, a calcified lesion detection and measurement unit that detects and measures a calcified lesion, or a fatty liver detection and measurement unit that detects and measures a fatty liver, the detection and measurement unit detects and measures at least one of a precancerous lesion or a liver cancer as the lesion, and the analysis unit analyzes a state of at least one of the precancerous lesion or the liver cancer as the lesion.

In one embodiment, the ultrasound information includes a plurality of types of ultrasound image data generated in different modes, and the analysis unit analyzes the state of the lesion by applying the plurality of types of ultrasound image data to a learning model constructed in advance.

In one embodiment, the analysis unit analyzes the state of the lesion based on at least one of a LUT calculation unit that analyzes the state of the lesion based on a look-up table acquired in advance, or a machine learning analysis unit that analyzes the state of the lesion based on a learning model constructed in advance.

In one embodiment, the analysis unit performs progression degree prediction of the lesion.

In one embodiment, a display controller is further provided, and the display controller displays the progression degree prediction of the lesion on a display unit, or displays the progression degree prediction of the lesion and a cause leading to the prediction on the display unit.

In one embodiment, the analysis unit performs determination on a treatment effect and further performs prediction on a treatment progress.

In one embodiment, a display controller is further provided, and the display controller displays information obtained by performing determination on the treatment effect and further performing prediction on the treatment progress on a display unit, or displays, on the display unit, the information obtained by performing determination on the treatment effect and performing prediction on the treatment progress, and a cause leading to the determination of the treatment effect and to the prediction of the treatment progress.

In one embodiment, the ultrasound information includes data indicating at least one of a B-mode image, a tissue harmonic image, a tissue elastography image, a share wave elastography image, an attenuation image, a color flow image, or a contrast-enhanced harmonic image.

According to the present disclosure, it is possible to reduce an effort required to obtain a diagnosis result for a lesion, and to enhance objectivity of the diagnosis result, to provide diagnostic support.

DESCRIPTION OF THE PREFERRED EMBODIMENTS

Figure 1:
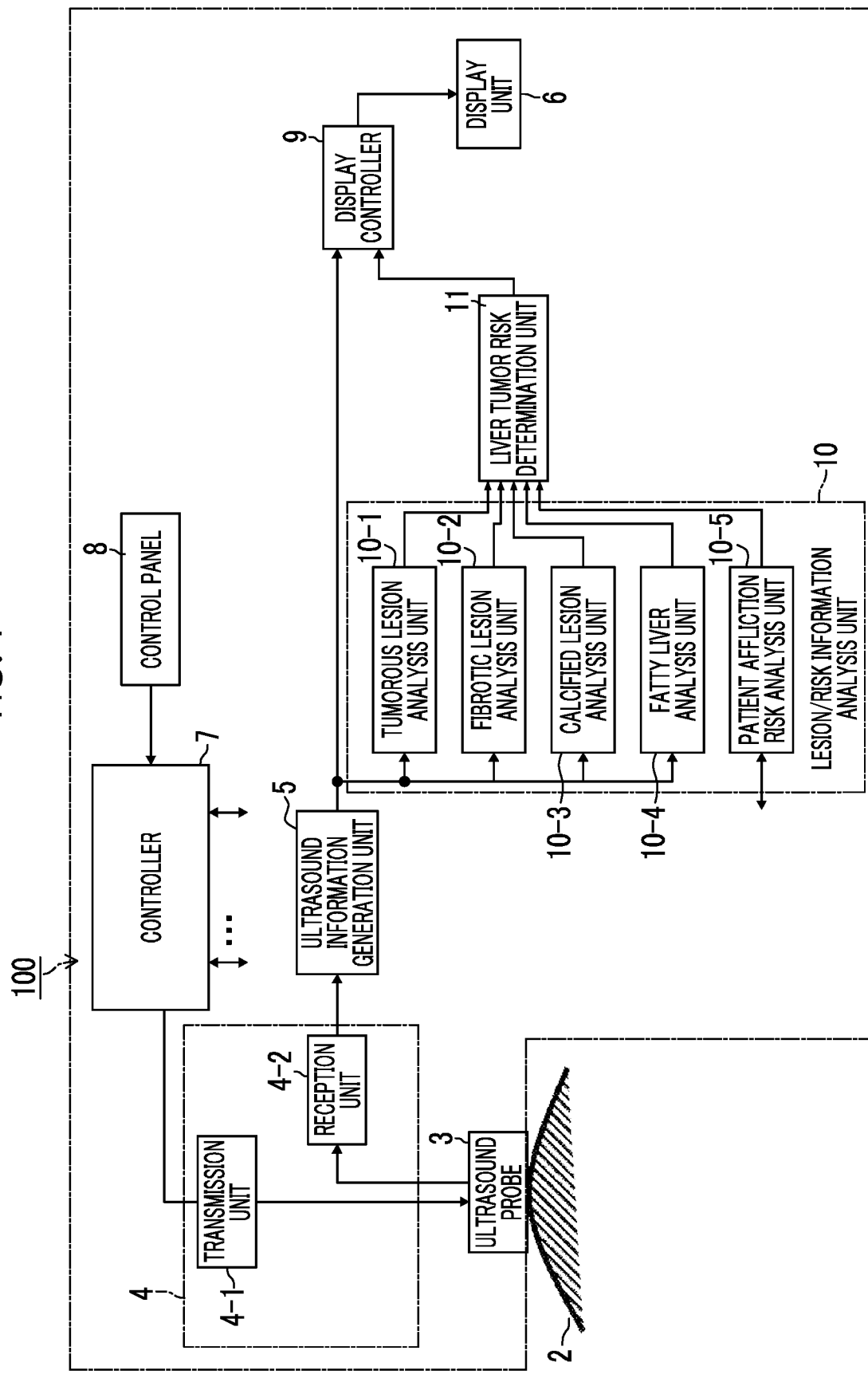
FIG. 1 is a diagram showing a configuration of an ultrasound diagnostic apparatus according to an embodiment of the present disclosure.

An embodiment of the present disclosure will be described with reference to each drawing. The same components shown in a plurality of drawings are designated by the same reference numerals, and the description thereof will not be repeated. FIG. 1 shows a configuration of an ultrasound diagnostic apparatus 100 according to the embodiment of the present disclosure. The ultrasound diagnostic apparatus 100 comprises an ultrasound probe 3, an ultrasound transmission and reception unit 4, an ultrasound information generation unit 5, a display unit 6, a controller 7, a control panel 8, a display controller 9, a lesion/risk information analysis unit 10, and a liver tumor risk determination unit 11.

The ultrasound information generation unit 5, the lesion/risk information analysis unit 10, the liver tumor risk determination unit 11, the display controller 9, and the controller 7 may be configured by processors as hardware. A processor that configures each of the ultrasound information generation unit 5, the lesion/risk information analysis unit 10, the liver tumor risk determination unit 11, the display controller 9, and the controller 7 implements each function by executing a program. The processor may comprise a memory that stores the program. In addition, the memory that stores the program may be provided outside the processor.

The controller 7 may perform overall control of the ultrasound diagnostic apparatus 100. Additionally, the control panel 8 may generate command information for the ultrasound diagnostic apparatus 100 in response to an operation of a user such as a doctor or an operator, and the controller 7 may control each component of the ultrasound diagnostic apparatus 100 according to the command information acquired from the control panel 8.

The ultrasound transmission and reception unit 4 comprises a transmission unit 4-1 and a reception unit 4-2. The ultrasound probe 3 comprises a plurality of ultrasound transducers. The transmission unit 4-1 outputs a transmission signal to each ultrasound transducer provided in the ultrasound probe 3 in accordance with the control by the controller 7. Each ultrasound transducer converts the transmission signal into an ultrasound wave and transmits the ultrasound wave to a subject 2. The controller 7 controls a delay time of the transmission signal output to each of the plurality of ultrasound transducers, so that a transmission beam is formed from the ultrasound probe 3 toward a specific direction. The subject 2 may be scanned with the transmission beam.

Each ultrasound transducer provided in the ultrasound probe 3 receives the ultrasound wave reflected by the subject 2, converts the reflected ultrasound wave into an electrical signal, and outputs the electrical signal to the reception unit 4-2. The reception unit 4-2 generates a reception signal by phase-adding the electrical signals output from respective ultrasound transducers, and outputs the reception signal to the ultrasound information generation unit 5. In the phase addition, the controller 7 adjusts a delay time of the electrical signal output from each ultrasound transducer, so that the reception signals are generated such that the electrical signals based on the ultrasound waves received from the direction of the transmission beam reinforce each other.

The ultrasound information generation unit 5 generates ultrasound image data and ultrasound measurement information based on the reception signals output from the reception unit 4-2 and outputs the ultrasound image data and the ultrasound measurement information to the lesion/risk information analysis unit 10 and the display controller 9. Here, the ultrasound measurement information may be information based on numerical values or the like indicating a measurement result.

The ultrasound probe 3, the ultrasound transmission and reception unit 4, the ultrasound information generation unit 5, and the controller 7 operate in various modes, such as a mode for generating B-mode image data (tomographic image data), a mode for generating elastography image data (image data indicating an elastic modulus distribution), a mode for generating tissue harmonic image data (image data based on harmonic components of reflected waves), and a mode for generating color Doppler image data. The reception signal corresponding to each mode is output from the ultrasound transmission and reception unit 4 to the ultrasound information generation unit 5. The ultrasound information generation unit 5 generates the ultrasound image data and the ultrasound measurement information generated according to each mode and outputs the ultrasound image data and the ultrasound measurement information to the lesion/risk information analysis unit 10 and the display controller 9.

Figure 2:
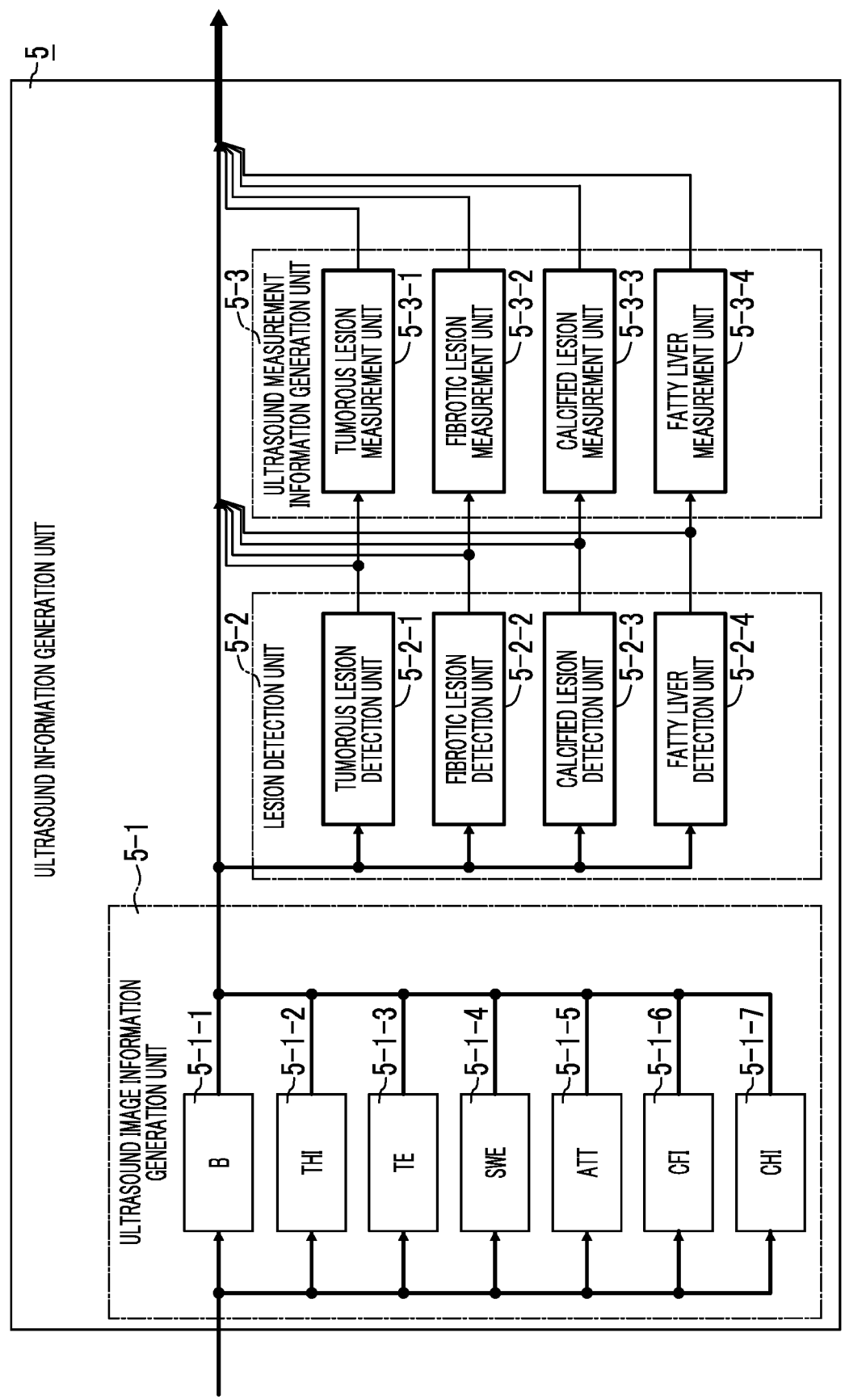
FIG. 2 is a diagram showing a configuration of an ultrasound information generation unit.

FIG. 2 shows the configuration of the ultrasound information generation unit 5. The ultrasound information generation unit 5 comprises an ultrasound image information generation unit 5-1, a lesion detection unit 5-2, and an ultrasound measurement information generation unit 5-3.

The ultrasound image information generation unit 5-1 comprises a B-mode image generation unit 5-1-1 (noted as B in the drawing), a tissue harmonic image generation unit 5-1-2 (noted as THI in the drawing), a tissue elastography image generation unit 5-1-3 (noted as TE in the drawing), a share wave elastography image generation unit 5-1-4 (noted as SWE in the drawing), an attenuation image generation unit 5-1-5 (noted as ATT in the drawing), a color flow image generation unit 5-1-6 (noted as CFI in the drawing), and a contrast-enhanced harmonic image generation unit 5-1-7 (noted as CHI in the drawing).

The B-mode image generation unit 5-1-1 generates B-mode image data representing a B-mode image in which reflected echo intensity (intensity of reflected ultrasound waves) is converted into brightness, and B-mode information (tissue distribution information, tissue shape information, and the like). The tissue harmonic image generation unit 5-1-2 generates tissue harmonic image data in which, in addition to the reflected echo intensity, the intensity of echoes that have non-linearly propagated in a living body is converted into brightness, and tissue harmonic information (tissue distribution information, shape information, and the like). The tissue elastography image generation unit 5-1-3 generates a displacement amount of the living body due to external pressure and strain image data in which the displacement amount is displayed with color. The share wave elastography image generation unit 5-1-4 generates a biological elastic modulus due to shear waves generated by ultrasonic radiation and share wave image data based on the biological elastic modulus. The attenuation image generation unit 5-1-5 generates ultrasound propagation attenuation information in the living body and attenuation image data. The color flow image generation unit 5-1-6 generates physical information (blood flow velocity, dispersion, intensity, and the like) and color flow image data based on Doppler measurement. The contrast-enhanced harmonic image generation unit 5-1-7 generates tissue enhancement information due to a contrast agent and harmonic data (contrast-enhanced harmonic image data) of the contrast agent echo.

The ultrasound image information generation unit 5-1 may comprise an ultrasound image generation unit (not shown) that generates Doppler image data for temporally tracing the blood flow velocity, M-image data for tracing a motion at a predetermined position, tissue tracking image data in which a motion of a biological tissue is detected and tracked, and the like.

The lesion detection unit 5-2 comprises a tumorous lesion detection unit 5-2-1, a fibrotic lesion detection unit 5-2-2, a calcified lesion detection unit 5-2-3, and a fatty liver detection unit 5-2-4. Each detection unit may output numerical information indicating the position of each lesion detected in the subject 2 and a range covered by each lesion.

Each detection unit constituting the lesion detection unit 5-2 may detect the lesion by using at least one or a combination of the following factors: (i) geometric image transformations such as an affine transformation, a scaling transformation, and a rotation transformation; (ii) edge enhancement processing and contrast enhancement processing; (iii) noise removal using an image filter; (iv) correction processing of eliminating influences such as body movements and probe operations; (v) segmentation processing of detecting lesions through edge detection, or probabilistic or morphological processing operations; (vi) pattern recognition with respect to a lesion model consisting of geometric information such as shapes or physical property information such as elasticity information; (vii) matching processing using correlation of feature amounts, statistical techniques, or combinations thereof; or (viii) machine learning processing using a convolutional neural network (CNN) trained with lesion images, or the like. The detection of the lesion is performed, for example, by generating numerical data for specifying a region where the lesion has occurred in the subject 2.

The tumorous lesion detection unit 5-2-1 detects a tumor. The tumorous lesion detection unit 5-2-1 may detect the tumor based on, for example, a characteristic echo pattern of the tumorous lesion. The characteristic echo pattern includes, for example, echo patterns showing nodular, mass-like, cystic, and the like. In addition, the tumorous lesion detection unit 5-2-1 may detect the tumor based on a size (a diameter of 1 cm or more, 3 cm or less, or the like), a shape (round, oval, irregular, or the like), boundary clarity, and irregularities of a region where the tumor is suspected. The tumorous lesion detection unit 5-2-1 may detect the tumor based on the presence or absence of an internal echo, the presence or absence of posterior echo enhancement, and the like in the B-mode image indicated by the B-mode image data. The tumorous lesion detection unit 5-2-1 may detect the tumor from non-linear information, strain information, elasticity information, attenuation information, blood flow information, and the like. The blood flow information may be information indicating the quantity, traveling (basket pattern, axial shape), properties (steady, pulsatile), enhancement information of the contrast agent (traveling, enhancement phases (arterial phase, portal venous phase, late phase)), and the like.

The fibrotic lesion detection unit 5-2-2 detects a fibrotic lesion. The fibrotic lesion detection unit 5-2-2 may detect the fibrotic lesion based on, for example, a characteristic echo pattern of the fibrotic lesion. The fibrotic lesion detection unit 5-2-2 may detect the fibrotic lesion based on the shape, the boundary, or the like of a region where the fibrotic lesion is suspected. The fibrotic lesion detection unit 5-2-2 may detect the fibrotic lesion based on the presence or absence of an internal echo, the presence or absence of posterior echo enhancement, a boundary line, and the like in the B-mode image indicated by the B-mode image data. The fibrotic lesion detection unit 5-2-2 may detect the fibrotic lesion from non-linear information, strain information (strain ratio and the like), elasticity information, attenuation information, blood flow information, anisotropic information, and the like.

The calcified lesion detection unit 5-2-3 detects a calcified lesion. The calcified lesion detection unit 5-2-3 may detect the calcified lesion based on a characteristic echo pattern of the calcified lesion. The calcified lesion detection unit 5-2-3 may detect the calcified lesion based on a point-like echo, a boundary of a region where the calcified lesion is suspected, the presence or absence of an internal echo, the presence or absence of a posterior echo, and the like in the B-mode image indicated by the B-mode image data. The calcified lesion detection unit 5-2-3 may detect the calcified lesion from non-linear information, strain information, elasticity information, attenuation information, sound velocity information, and the like.

The fatty liver detection unit 5-2-4 detects a fatty liver. The fatty liver detection unit 5-2-4 may detect the fatty liver based on a characteristic echo pattern (high-brightness liver, deep portion attenuation, and unclear intrahepatic portal veins and veins) of the fatty liver. The fatty liver detection unit 5-2-4 may detect the fatty liver based on the liver-kidney contrast, kidney-spleen contrast, posterior scattering, and the like in the B-mode image indicated by the B-mode image data. The fatty liver detection unit 5-2-4 may detect the fatty liver from attenuation information, non-linear information, strain information, elasticity information, and sound velocity information.

The ultrasound measurement information generation unit 5-3 comprises a tumorous lesion measurement unit 5-3-1, a fibrotic lesion measurement unit 5-3-2, a calcified lesion measurement unit 5-3-3, and a fatty liver measurement unit 5-3-4. Each measurement unit may output various measured values for each lesion detected by each detection unit as the ultrasound measurement information.

Each measurement unit constituting the ultrasound measurement information generation unit 5-3 may measure the feature amounts of the lesion for a lesion site, based on the following factors: (i) geometric attribute analysis for a diameter, a partition wall thickness, an area, and the like; (ii) structural or statistical texture analysis of the lesion; (iii) motion analysis such as hemodynamics, or temporal and spatial displacement amounts; and (iv) analysis for an image and a signal indicating changes in information on the inside, the outside, or the boundary line periphery of the lesion (reflected echoes, biological non-linearity information, strain information, elasticity information, attenuation information, and velocity information); and the like.

The tumorous lesion measurement unit 5-3-1 measures the feature amount of the tumorous lesion detected by the tumorous lesion detection unit 5-2-1. The feature amount of the tumorous lesion is a numerical value or information indicating the feature of the tumorous lesion. The feature amount of the tumorous lesion includes a maximum diameter of the tumorous lesion, information indicating a tumorous occurrence location, the number of tumors, information indicating a tumor structure, information indicating hemodynamics, a displacement amount, the strain information, the elasticity information, the attenuation information, the velocity information, information indicating a pattern within the tumor, information indicating a pattern around the tumor, boundary portion echo intensity, posterior echo intensity, the enhancement information of the contrast agent, and the like.

The fibrotic lesion measurement unit 5-3-2 measures the feature amount of the fibrotic lesion detected by the fibrotic lesion detection unit 5-2-2. The feature amount of the fibrotic lesion is a numerical value or information indicating the feature of the fibrotic lesion. The feature amount of the fibrotic lesion includes information indicating a region of the fibrotic lesion, information indicating a fibrosis occurrence location, the number, information indicating a fibrotic lesion structure, information indicating hemodynamics, a displacement amount, the strain information, the elasticity information, the attenuation information, the velocity information, information indicating a fibrosis pattern, information indicating a peripheral pattern, boundary portion echo intensity, posterior echo intensity, and the like.

The calcified lesion measurement unit 5-3-3 measures the feature amount of the calcified lesion detected by the calcified lesion detection unit 5-2-3. The feature amount of the calcified lesion is a numerical value or information indicating the feature of the calcified lesion. The feature amount of the calcified lesion includes a diameter of the calcified lesion, information indicating a calcification occurrence location, the number, the elasticity information, the attenuation information, the velocity information, information indicating a calcification pattern, the boundary portion echo intensity, the posterior echo intensity, and the like.

The fatty liver measurement unit 5-3-4 measures the feature amount of the fatty liver detected by the fatty liver detection unit 5-2-4. The feature amount of the fatty liver is a numerical value or information indicating the feature of the fatty liver. The feature amount of the fatty liver includes brightness of the high-brightness liver, a deep portion attenuation amount, information indicating the clarity of the intrahepatic portal veins and veins, information indicating the liver-kidney contrast, the information indicating the kidney-spleen contrast, the non-linear information, the strain information, the elasticity information, the sound velocity information, and the like.

Returning to FIG. 1, description will be provided. The lesion/risk information analysis unit 10 analyzes each lesion based on each ultrasound image data and each ultrasound measurement information obtained by the ultrasound information generation unit 5 and outputs analysis information indicating an analysis result to the liver tumor risk determination unit 11. The lesion/risk information analysis unit 10 comprises a tumorous lesion analysis unit 10-1, a fibrotic lesion analysis unit 10-2, a calcified lesion analysis unit 10-3, a fatty liver analysis unit 10-4, and a patient affliction risk analysis unit 10-5.

The tumorous lesion analysis unit 10-1 analyzes tumorous lesions including solid and cystic lesions. The fibrotic lesion analysis unit 10-2 analyzes the fibrotic lesion. The calcified lesion analysis unit 10-3 analyzes the calcified lesion. The fatty liver analysis unit 10-4 analyzes the fatty liver. The patient affliction risk analysis unit 10-5 analyzes an affliction risk of a patient from medical information regarding the patient read from the control panel 8. The medical information regarding the patient may be acquired by the patient affliction risk analysis unit 10-5 from an electronic medical chart, an analyzer, a picture archiving and communication system (PACS), another diagnostic device, or the like via a network.

Figure 3:
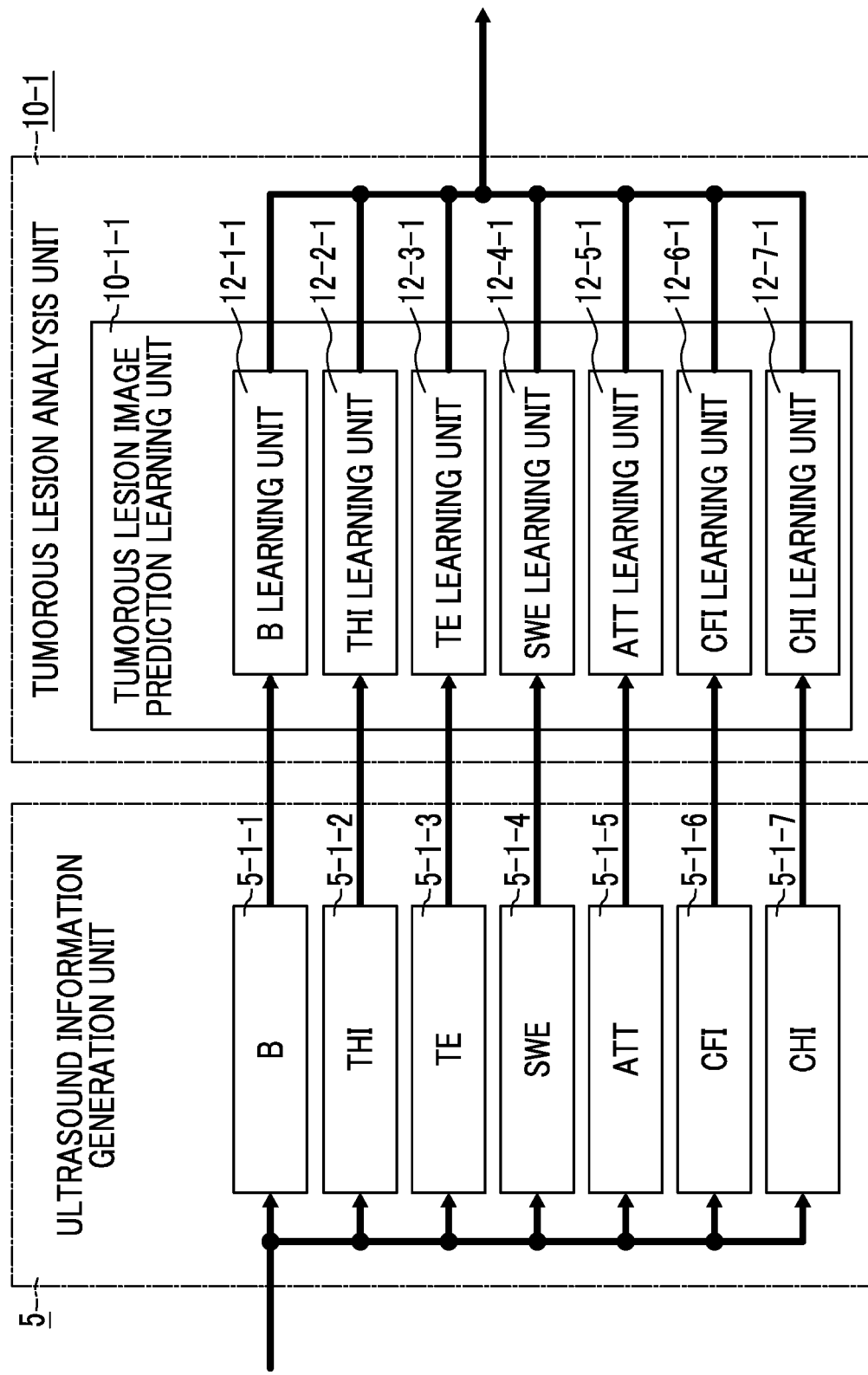
FIG. 3 is a diagram showing a configuration of a tumorous lesion analysis unit together with a part of components of the ultrasound information generation unit.
Figure 4:
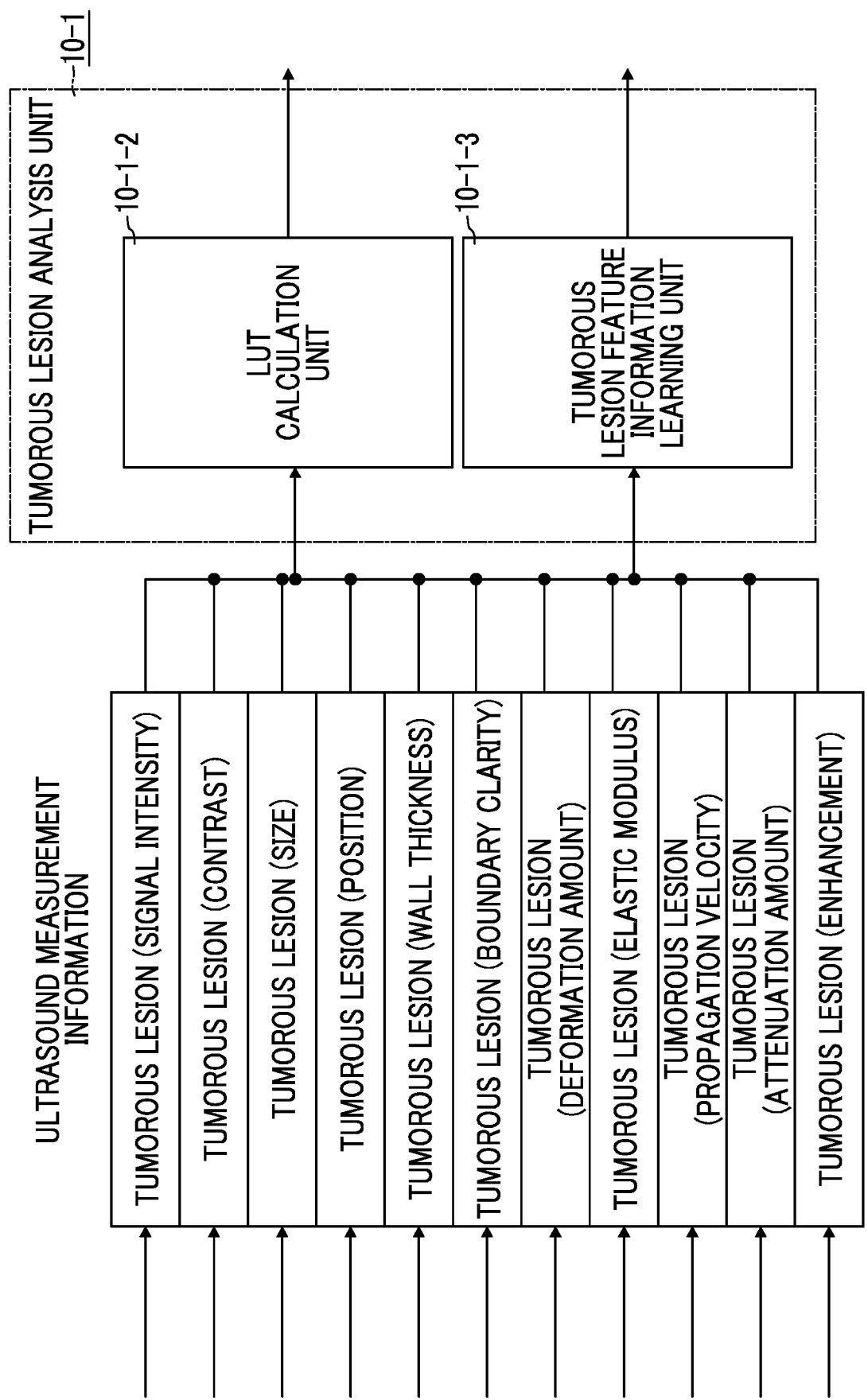
FIG. 4 is a diagram showing a configuration of the tumorous lesion analysis unit together with a part of components of the ultrasound information generation unit.

FIGS. 3 and 4 show the configuration of the tumorous lesion analysis unit 10-1 together with a part of components of the ultrasound information generation unit 5. The tumorous lesion analysis unit 10-1 comprises a tumorous lesion image prediction learning unit 10-1-1, a LUT calculation unit 10-1-2, and a tumorous lesion feature information learning unit 10-1-3. The tumorous lesion image prediction learning unit 10-1-1 has a machine learning function such as a CNN that generates analysis information by analyzing the tumorous lesion from the ultrasound image data and the ultrasound measurement information generated by the ultrasound information generation unit 5. The LUT calculation unit 10-1-2 stores operational information based on statistical information of tumorous lesions, medical guidelines, and the like from the ultrasound measurement information generated by the ultrasound information generation unit 5, as a look-up table (LUT). The LUT calculation unit 10-1-2 generates analysis information based on the look-up table. The tumorous lesion feature information learning unit 10-1-3 has a machine learning function such as a recurrent neural network (RNN) or a long short term memory (LSTM) and generates analysis information by estimating the prognosis of the tumorous lesion from continuous information.

The tumorous lesion image prediction learning unit 10-1-1 is composed of a plurality of machine learning units, each of which has a learning function, such as a CNN. The tumorous lesion image prediction learning unit 10-1-1 comprises a B learning unit 12-1-1 that learns B-mode images, a THI learning unit 12-2-1 that learns THI images, a TE learning unit 12-3-1 that learns TE images, an SWE learning unit 12-4-1 that learns SWE images, an ATT learning unit 12-5-1 that learns ATT images, a CFI learning unit 12-6-1 that learns CFI images, and a CHI learning unit 12-7-1 that learns CHI images. Although not shown in FIG. 3, the tumorous lesion image prediction learning unit 10-1-1 may comprise a learning unit for ultrasound image data generated in another mode.

Here, the THI image, the TE image, the SWE image, the ATT image, the CFI image, and the CHI image refer to a tissue harmonic image, a tissue elastography image, a share wave elastography image, an attenuation image, a color flow image, and a contrast-enhanced harmonic image, respectively.

Each learning unit has the following functions. That is, respective learning units use learning models constructed in advance to extract, as tumorous lesion information, at least any of: (i) echo patterns such as a tumor diameter, an aspect ratio, cystic nature, mixed nature, and solid nature; (ii) tumor shapes such as a round shape, a polygonal shape, a lobulated shape, an irregular shape, and an elliptical shape; (iii) internal echo information within the tumor, such as uniformity and levels; (iv) boundary portion echo information such as echo intensity, smoothness, and a clarity degree of the boundary; (v) calcification information such as posterior echo information, the presence or absence of calcifications, and the number of calcifications; (vi) a liver normal image tagged with the tumorous lesion information such as the presence or absence of intraductal progression, or prediction information such as lesion progression and treatment progress; or (vii) a liver tumorous lesion image, from ultrasound images of a patient to be determined, that is, the B-mode image, the THI image, the TE image, the SWE image, the ATT image, the CFI image, and the CHI image, and, as analysis information, prediction information.

Each learning unit performs machine learning before the diagnosis of the subject 2 is performed. That is, each learning unit stores, as training data, a relationship between ultrasound image data and the analysis information obtained for the ultrasound image data, for each of a plurality of diagnoses or observations performed in the past on various subjects or phantoms, thereby constructing the learning model. This learning model may be a learning model from which the analysis information for new ultrasound image data can be obtained by providing the new ultrasound image data.

Here, by providing the learning unit for each ultrasound information and training the learning unit by using a feature image of the lesion extracted for each ultrasound information (information indicating the structure, the elasticity, the attenuation, the velocity, the enhancement, or the like), it is possible to accurately extract the tumorous lesion information, and the prediction information or the analysis information.

FIG. 4 shows the LUT calculation unit 10-1-2 and the tumorous lesion feature information learning unit 10-1-3. The LUT calculation unit 10-1-2 acquires the operational information based on the statistical information of the tumorous lesions, medical guidelines, and the like from the ultrasound measurement information generated by the ultrasound information generation unit 5, and stores the operational information as a look-up table. Examples of the medical guidelines include an abdominal ultrasound medical examination determination manual, ultrasound diagnostic criteria for a liver mass, and an ultrasound elastography diagnostic guideline. Evidence information stored in the LUT can be changed depending on the country or region.

The look-up table may be created in advance based on statistics based on past diagnosis results, or the like. The look-up table may be a table from which the analysis information can be obtained by providing the ultrasound measurement information generated by the ultrasound information generation unit 5.

The tumorous lesion feature information learning unit 10-1-3 has a machine learning function such as an RNN or an LSTM. The tumorous lesion feature information learning unit 10-1-3 performs machine learning before the diagnosis of the subject 2 is performed. That is, the tumorous lesion feature information learning unit 10-1-3 stores, as training data, a relationship between ultrasound measurement information and the analysis information obtained for the ultrasound measurement information, for each of a plurality of diagnoses or observations performed in the past on various subjects or phantoms, thereby constructing the learning model. This learning model may be a learning model from which the analysis information for new ultrasound measurement information can be obtained by providing the new ultrasound measurement information.

The tumorous lesion feature information learning unit 10-1-3 uses the learning model constructed in advance to extract the tumorous lesion information from continuous information of a patient to be determined, for example, a lesion follow-up observation period and lesion change information, and a treatment follow-up observation period and lesion change information, and, as the analysis information, the prediction information. The learning model constructed in advance may be constructed, for example, by learning continuous information tagged with various conditions, factors, and the like related to the measurement results for the lesion follow-up observation period and the lesion change information, and the treatment follow-up observation period and the lesion change information.

In FIG. 4, as the ultrasound measurement information generated by the ultrasound information generation unit 5, the signal intensity, contrast, size, position, wall thickness, boundary clarity, deformation amount, elastic modulus, propagation velocity of elastic waves, attenuation amount, and enhancement information of the tumorous lesion are shown as input information. This is an example of useful information narrowed down in tumorous lesion analysis. In addition, a configuration may be employed in which weighting coefficients are incorporated into numerical values indicated by the ultrasound measurement information according to the superiority of ultrasound measurement information. Regarding information combination or the like, for example, reconstruction or optimization of the weighting coefficient may be performed using lesion information based on a final determination result.

Figure 5:
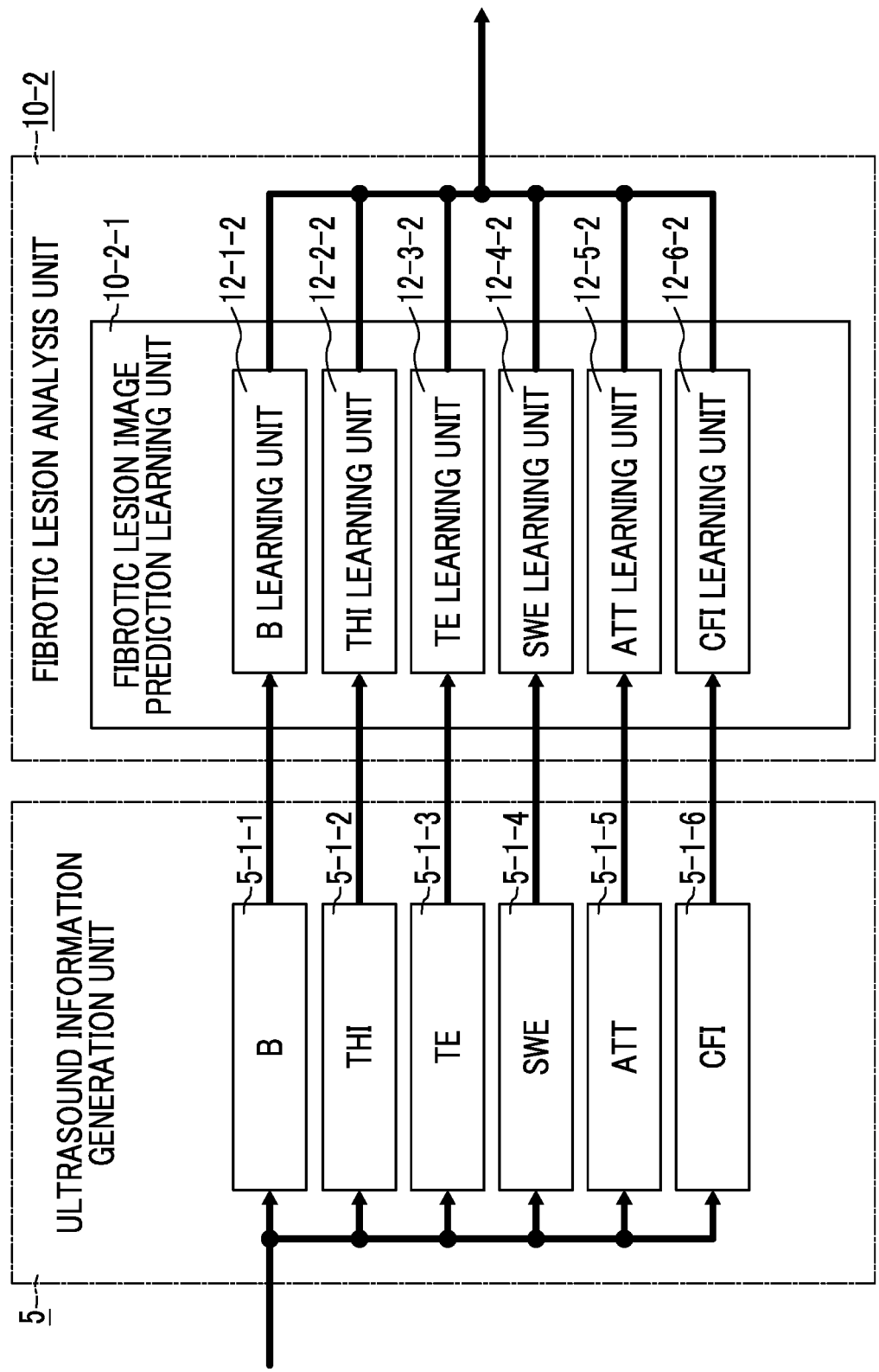
FIG. 5 is a diagram showing a configuration of a fibrotic lesion analysis unit together with a part of components of the ultrasound information generation unit.
Figure 6:
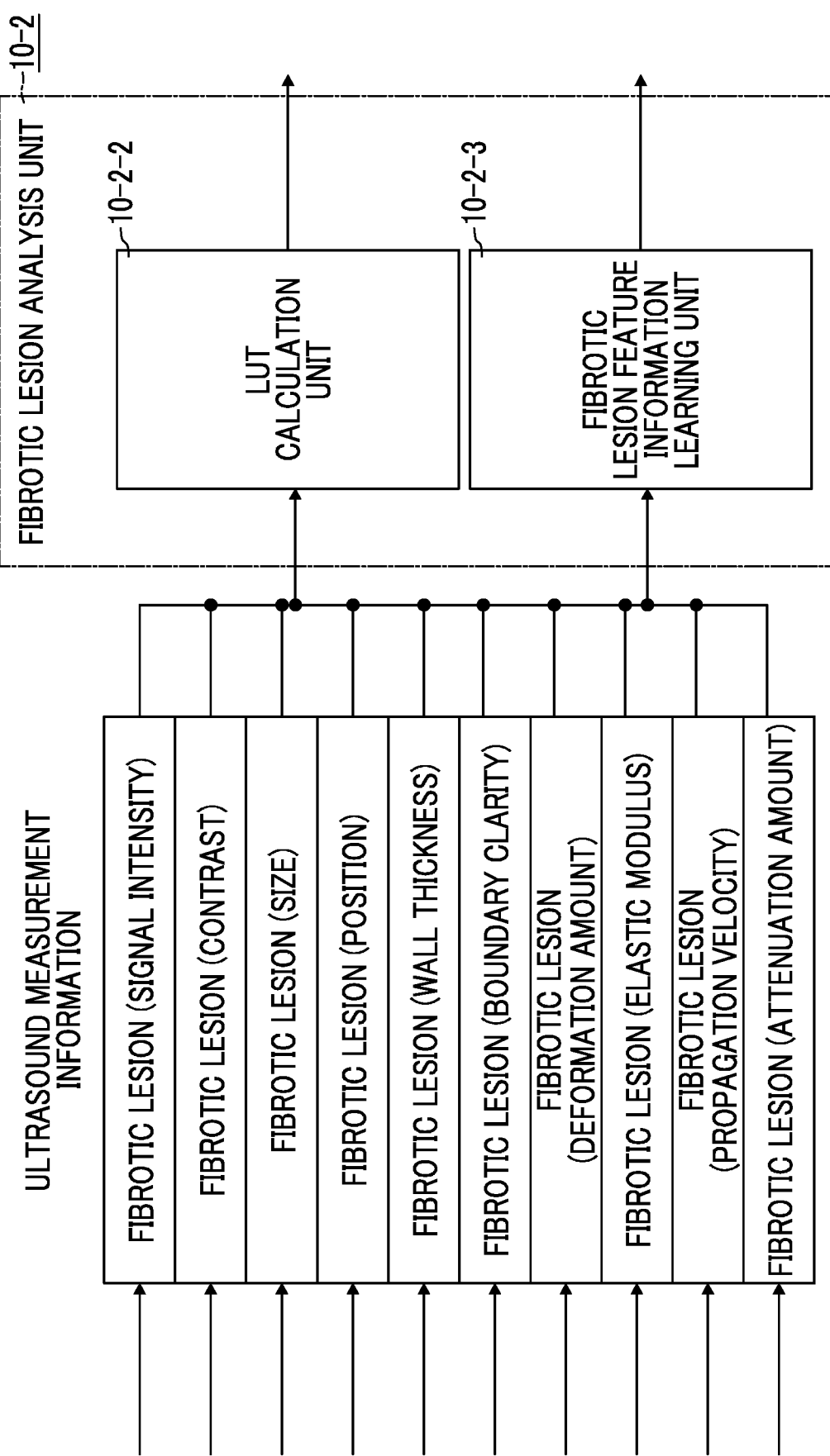
FIG. 6 is a diagram showing a configuration of the fibrotic lesion analysis unit together with a part of components of the ultrasound information generation unit.

FIGS. 5 and 6 show the configuration of the fibrotic lesion analysis unit 10-2 together with a part of components of the ultrasound information generation unit 5. The fibrotic lesion analysis unit 10-2 comprises a fibrotic lesion image prediction learning unit 10-2-1, a LUT calculation unit 10-2-2, and a fibrotic lesion feature information learning unit 10-2-3.

The fibrotic lesion image prediction learning unit 10-2-1 has a machine learning function such as a CNN that generates analysis information by analyzing the fibrotic lesion from the ultrasound image data and the ultrasound measurement information generated by the ultrasound information generation unit 5. The LUT calculation unit 10-2-2 acquires operational information based on statistical information of fibrotic lesions, medical guidelines, and the like from the ultrasound measurement information generated by the ultrasound information generation unit 5, and stores the operational information as a look-up table. The LUT calculation unit 10-2-2 generates analysis information based on the look-up table. The fibrotic lesion feature information learning unit 10-2-3 has a machine learning function such as an RNN or an LSTM and generates analysis information by estimating the prognosis of the fibrotic lesion from continuous information.

The fibrotic lesion image prediction learning unit 10-2-1 comprises a B learning unit 12-1-2 that learns B-mode images, a THI learning unit 12-2-2 that learns THI images, a TE learning unit 12-3-2 that learns TE images, an SWE learning unit 12-4-2 that learns SWE images, an ATT learning unit 12-5-2 that learns ATT images, and a CFI learning unit 12-6-2 that learns CFI images. In the following description, for a B learning unit 12-1-$k$, a THI learning unit 12-2-$k$, a TE learning unit 12-3-$k$, an SWE learning unit 12-4-$k$, an ATT learning unit 12-5-$k$, and a CFI learning unit 12-6-$k$ ($k$=1 to 4) that have the same learning target, reference numerals are used without the "-k" at the end, and a comprehensive description including k=1 to 4 may be provided.

The fibrotic lesion image prediction learning unit 10-2-1 is different from the tumorous lesion image prediction learning unit 10-1-1 of which the analysis target is the tumorous lesion in that the analysis target is the fibrotic lesion. In addition, the fibrotic lesion image prediction learning unit 10-2-1 is different from the tumorous lesion image prediction learning unit 10-1-1 in that the CHI learning unit 12-7-1 is not provided. The fibrotic lesion image prediction learning unit 10-2-1 has the same configuration as the tumorous lesion image prediction learning unit 10-1-1 in other respects and executes the same processing.

The reason why the CHI learning unit 12-7-1 and related components may not be used in the analysis of the fibrotic lesion is as follows. In normal liver cells, there are phagocytic cells that temporarily engulf contrast agents and are incorporated into cells, but in the tumorous lesion, these phagocytic cells undergo apoptosis. Therefore, in the tumorous lesion, no contrast enhancement occurs. This makes the tissue enhancement information due to the contrast agent (the time it takes for the contrast agent to enhance and time it takes for the contrast agent to leak) crucial in the tumorous lesion. In the fibrotic lesion, connective tissue increases and deteriorates due to repeated necrosis and repair of liver cells caused by chronic inflammation, which may affect the contrast agent, but is not necessarily as crucial as in the tumorous lesion. The calcified lesion and the fatty liver are not necessarily as crucial as the tumorous lesion.

The LUT calculation unit 10-2-2 and the fibrotic lesion feature information learning unit 10-2-3 shown in FIG. 6 are different from the LUT calculation unit 10-1-2 and the tumorous lesion feature information learning unit 10-1-3 of which the analysis targets are the tumorous lesions in that the analysis targets are the fibrotic lesions. In addition, the LUT calculation unit 10-2-2 and the fibrotic lesion feature information learning unit 10-2-3 are different from the LUT calculation unit 10-1-2 and the tumorous lesion feature information learning unit 10-1-3 of which the analysis targets are the tumorous lesions in that the enhancement information of the ultrasound measurement information is not used. The LUT calculation unit 10-2-2 and the fibrotic lesion feature information learning unit 10-2-3 have the same configurations as the LUT calculation unit 10-1-2 and the tumorous lesion feature information learning unit 10-1-3 in other respects and execute the same processing.

Figure 7:
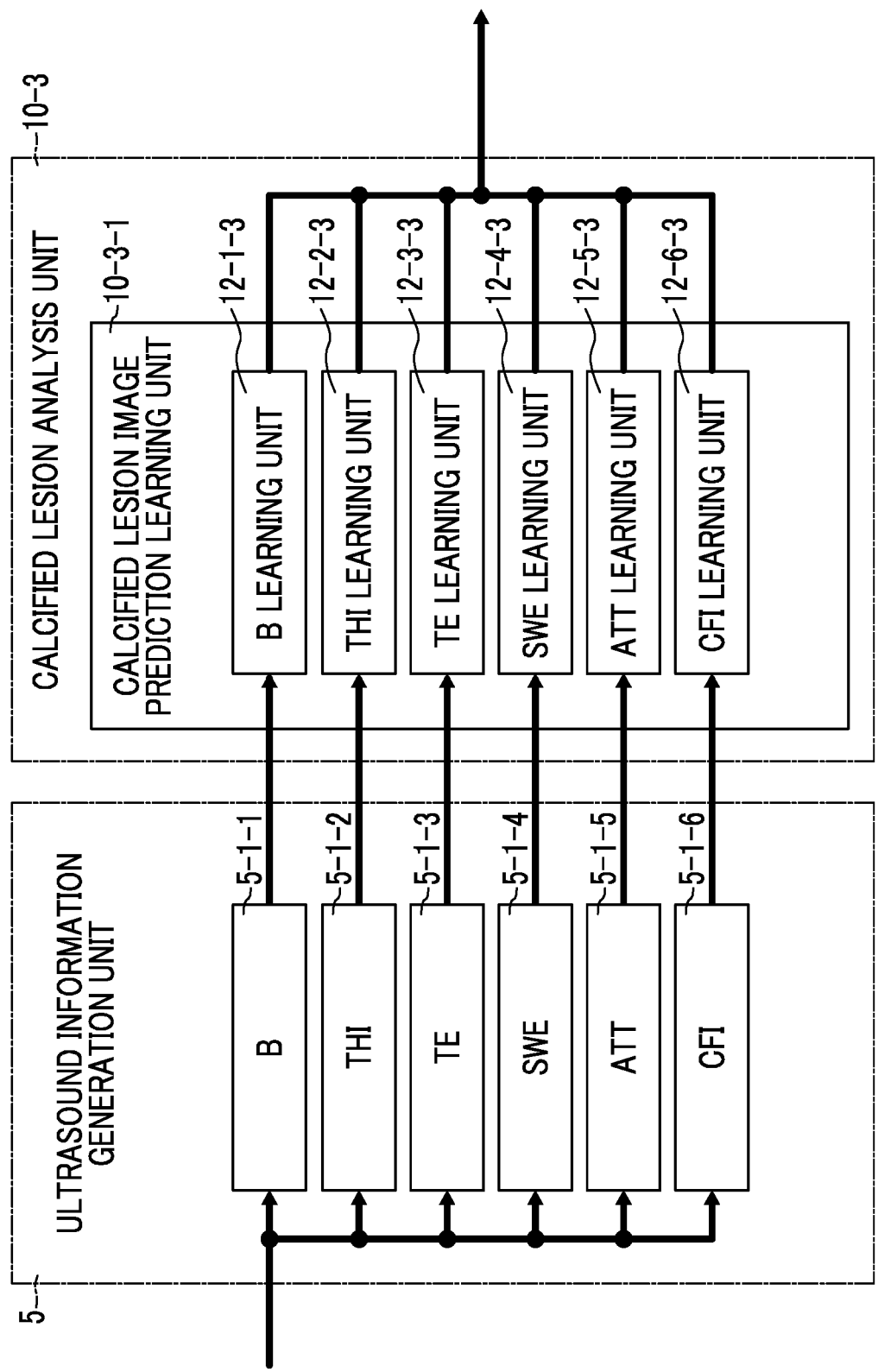
FIG. 7 is a diagram showing a configuration of the calcified lesion analysis unit together with a part of components of the ultrasound information generation unit.
Figure 8:
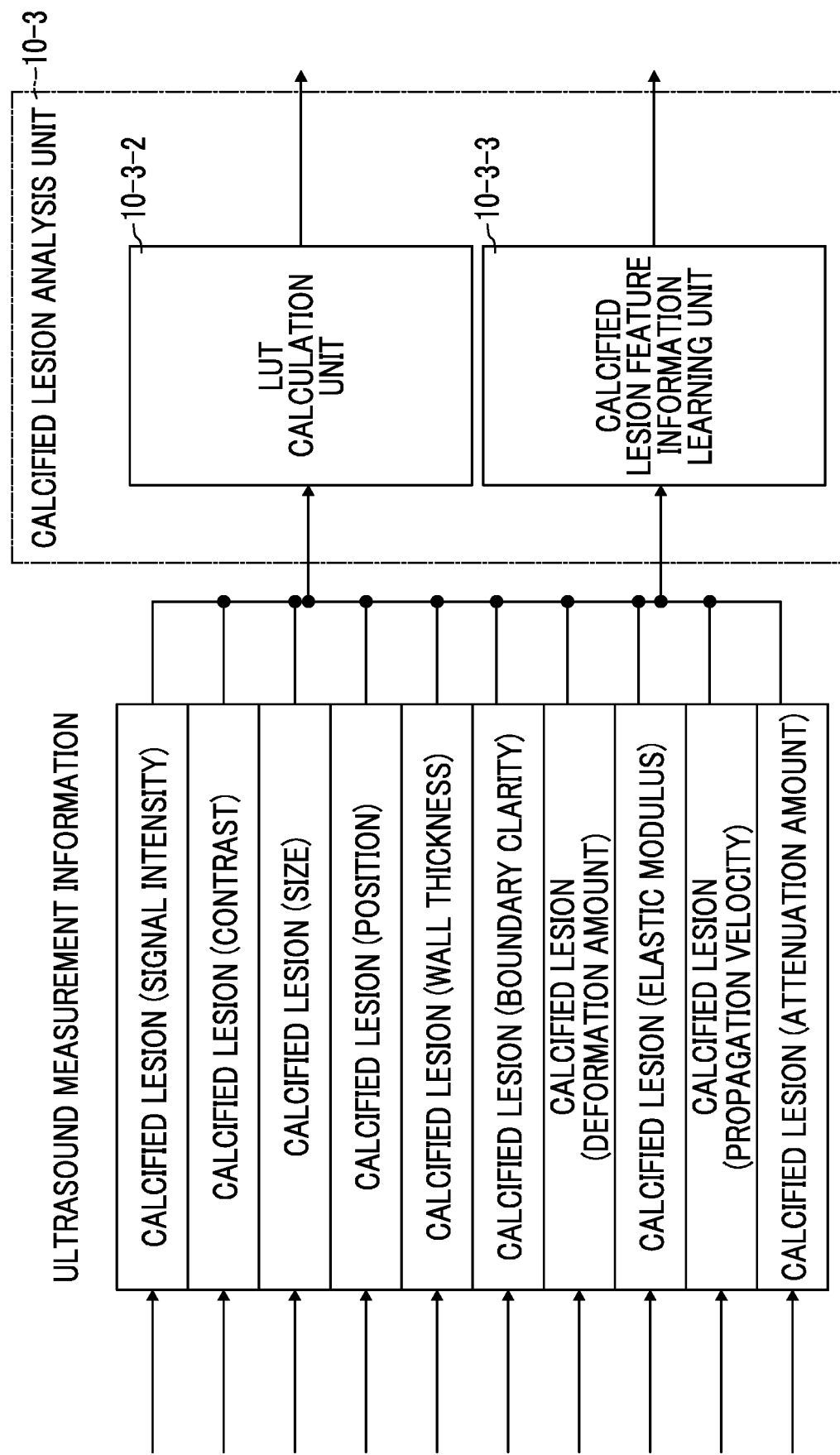
FIG. 8 is a diagram showing a configuration of the calcified lesion analysis unit together with a part of components of the ultrasound information generation unit.

FIGS. 7 and 8 show the configuration of the calcified lesion analysis unit 10-3 together with a part of components of the ultrasound information generation unit 5. The calcified lesion analysis unit 10-3 comprises a calcified lesion image prediction learning unit 10-3-1, a LUT calculation unit 10-3-2, and a calcified lesion feature information learning unit 10-3-3.

The calcified lesion image prediction learning unit 10-3-1 has a machine learning function such as a CNN that generates analysis information by analyzing the calcified lesion from the ultrasound image data and the ultrasound measurement information generated by the ultrasound information generation unit 5. The LUT calculation unit 10-3-2 acquires operational information based on statistical information of calcified lesions, medical guidelines, and the like from the ultrasound measurement information generated by the ultrasound information generation unit 5, and stores the operational information as a look-up table. The LUT calculation unit 10-3-2 generates analysis information based on the look-up table. The calcified lesion feature information learning unit 10-3-3 has a machine learning function such as an RNN or an LSTM and generates analysis information by estimating the prognosis of the calcified lesion from continuous information.

The calcified lesion analysis unit 10-3 is different from the fibrotic lesion analysis unit 10-2 of which the analysis target is the fibrotic lesion in that the analysis target is the calcified lesion. The calcified lesion analysis unit 10-3 has the same configuration as the fibrotic lesion analysis unit 10-2 in other respects and executes the same processing.

Figure 9:
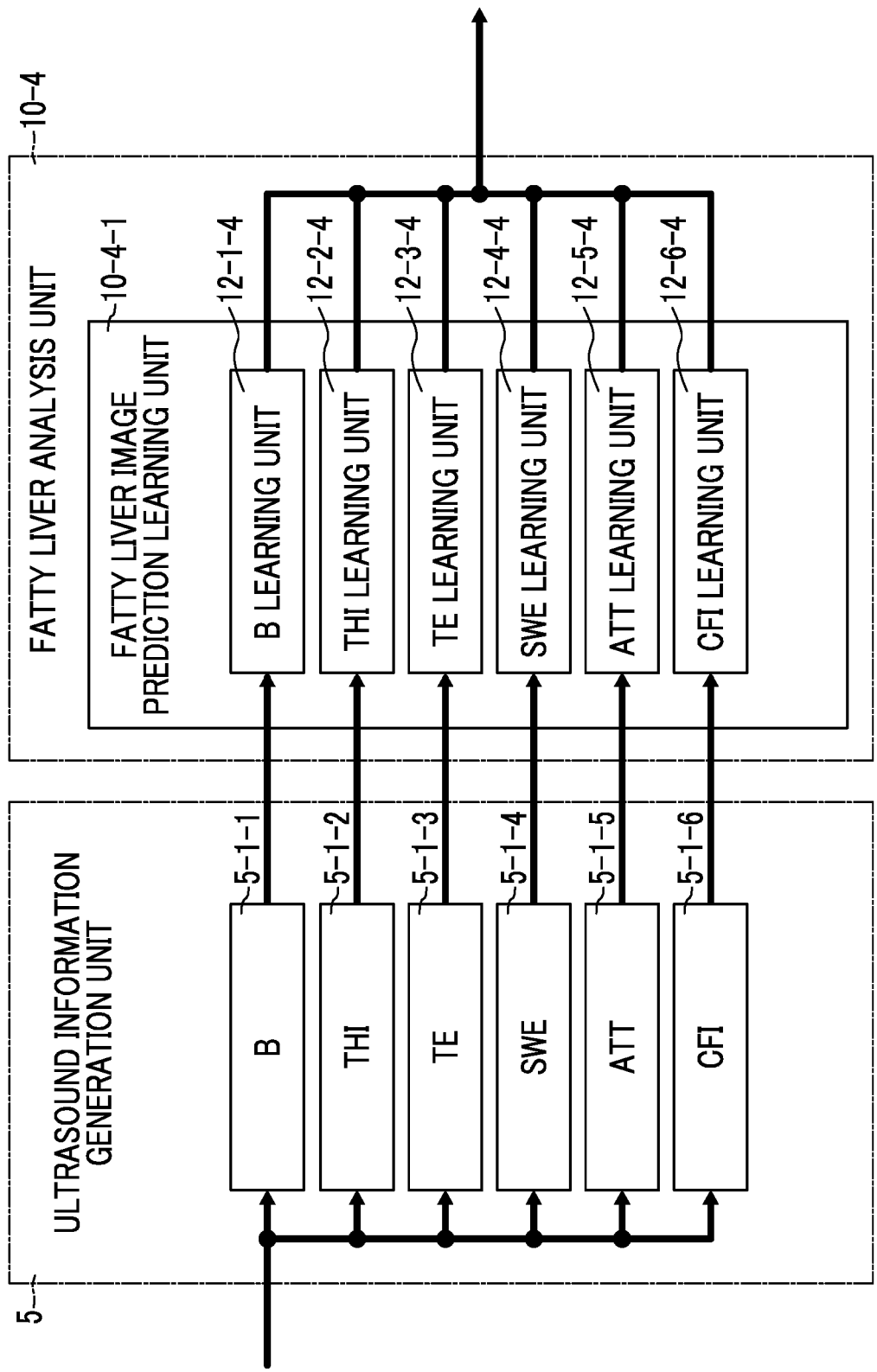
FIG. 9 is a diagram showing a configuration of a fatty liver analysis unit together with a part of components of the ultrasound information generation unit.
Figure 10:
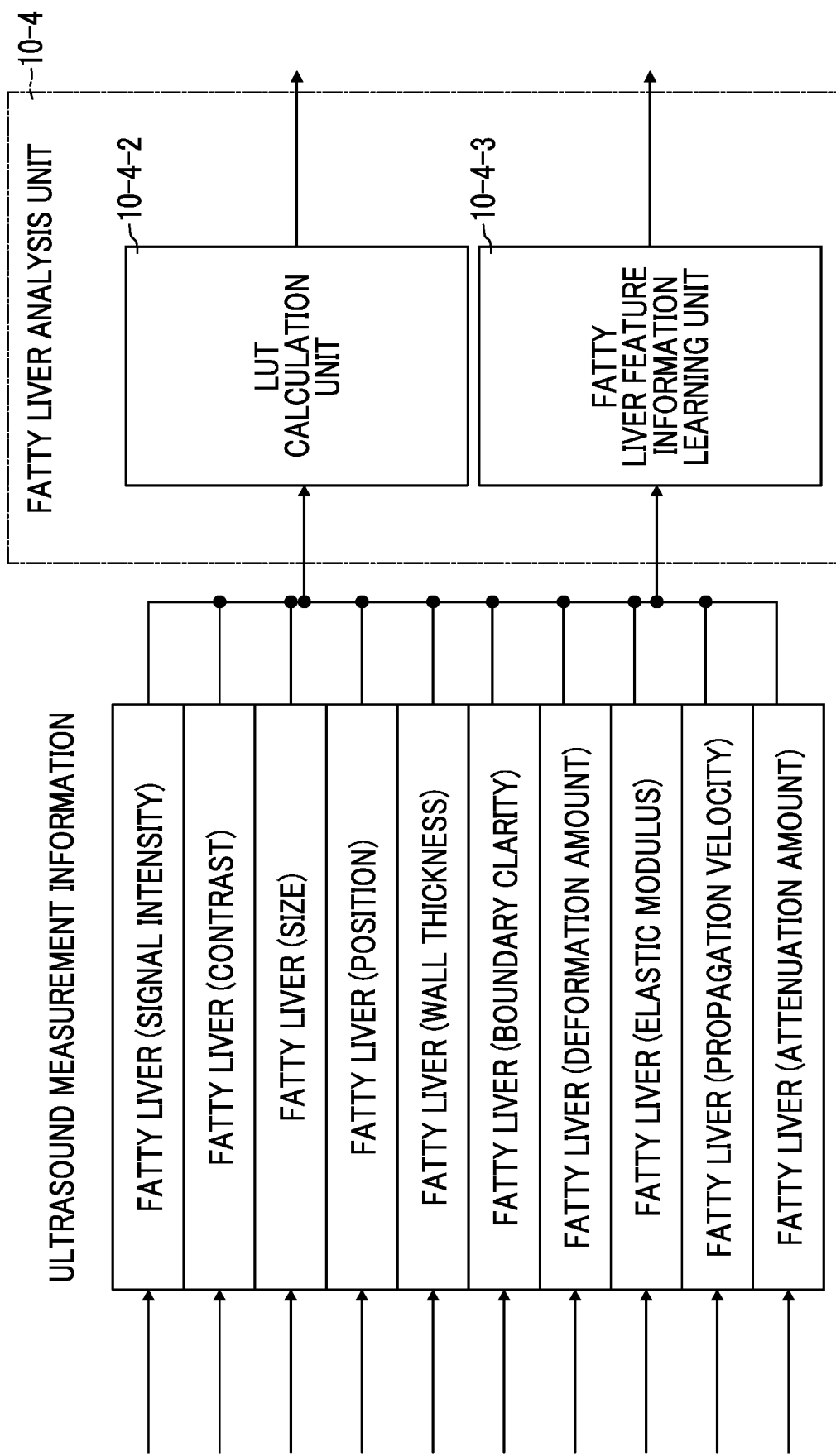
FIG. 10 is a diagram showing a configuration of the fatty liver analysis unit together with a part of components of the ultrasound information generation unit.

FIGS. 9 and 10 show the configuration of the fatty liver analysis unit 10-4 together with a part of components of the ultrasound information generation unit 5. The fatty liver analysis unit 10-4 comprises a fatty liver image prediction learning unit 10-4-1, a LUT calculation unit 10-4-2, and a fatty liver feature information learning unit 10-4-3. The fatty liver image prediction learning unit 10-4-1 has a machine learning function such as a CNN that generates analysis information by analyzing the fatty liver from the ultrasound image data and the ultrasound measurement information generated by the ultrasound information generation unit 5. The LUT calculation unit 10-4-2 acquires operational information based on statistical information of the fatty liver, medical guidelines, and the like from the ultrasound measurement information generated by the ultrasound information generation unit 5, and stores the operational information as a look-up table. The LUT calculation unit 10-4-2 generates analysis information based on the look-up table. The fatty liver feature information learning unit 10-4-3 has a machine learning function such as an RNN or an LSTM and generates analysis information by estimating the prognosis of the fatty liver from continuous information.

The fatty liver analysis unit 10-4 is different from the fibrotic lesion analysis unit 10-2 of which the analysis target is the fibrotic lesion in that the analysis target is the fatty liver. The fatty liver analysis unit 10-4 has the same configuration as the fibrotic lesion analysis unit 10-2 in other respects and executes the same processing.

Figure 11:
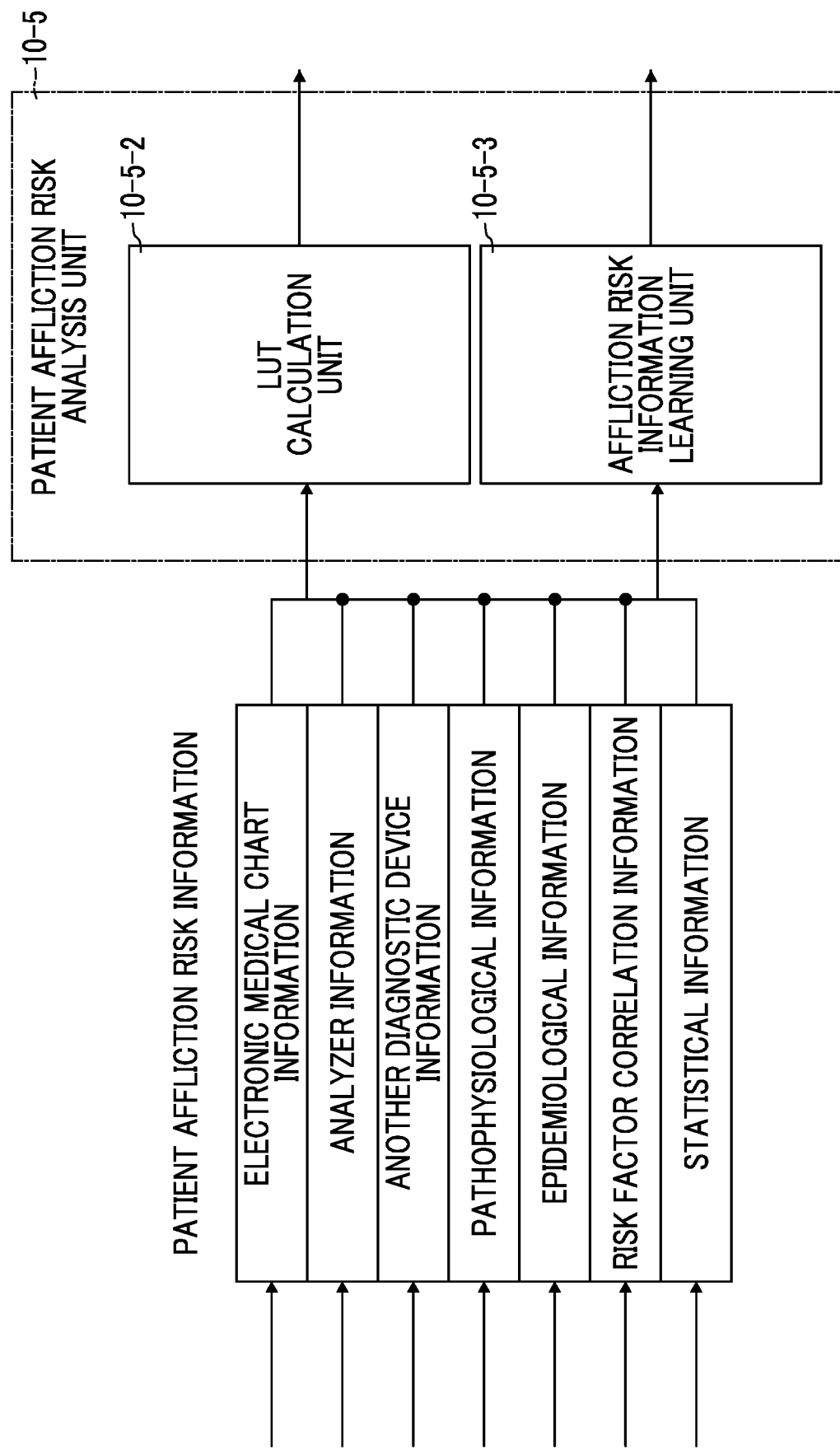
FIG. 11 is a diagram showing a configuration of a patient affliction risk analysis unit together with a part of components of the ultrasound information generation unit.

FIG. 11 shows the configuration of the patient affliction risk analysis unit 10-5 together with a part of components of the ultrasound information generation unit 5. The patient affliction risk analysis unit 10-5 comprises a LUT calculation unit 10-5-2 and an affliction risk information learning unit 10-5-3.

The LUT calculation unit 10-5-2 acquires a result of pathophysiological analysis, regional and environmental analysis, epidemiological analysis, correlation analysis with risk factors, statistical analysis, or biochemical analysis from the patient's medical information and stores the result as a look-up table. The LUT calculation unit 10-5-2 generates analysis information based on the look-up table. The patient's medical information includes patient hearing information such as age, height, weight, family medical history, and lifestyle and habits, physiological examination information such as blood and endocrine, genetic information such as tumor markers, other image diagnosis information, information on the patient's radiation treatment and drug therapy, and the like. The patient's medical information may be acquired by the patient affliction risk analysis unit 10-5 from an electronic medical chart, an analyzer, a picture archiving and communication system (PACS), another diagnostic device, or the like via a network. In addition, the control panel 8 may read the patient's medical information in response to the operation of the user, and the patient's medical information may be input to the patient affliction risk analysis unit 10-5 by the control panel 8 via the controller 7. The affliction risk information learning unit 10-5-3 performs learning analysis by using a patient affliction risk model constructed through machine learning on a neural network or the like and extracts the patient's liver tumor affliction risk and the feature amount of the treatment effect as analysis information.

Returning to FIG. 1, description will be provided. The liver tumor risk determination unit 11 comprehensively differentiates a liver tumor based on each analysis information obtained from the lesion/risk information analysis unit 10 and performs progression degree prediction, determination on the treatment effect, treatment progress prediction, and the like. The liver tumor risk determination unit 11 generates determination result information indicating a region covered by the liver tumor in the subject 2, the progression degree prediction, the determination on the treatment effect, the treatment progress prediction, and the like. The liver tumor risk determination unit 11 comprehensively judges analysis information regarding the tumorous lesion, the fibrotic lesion, the calcified lesion, the fatty liver, and the patient's medical information by using multimodal artificial intelligence (AI). Here, the multimodal AI refers to artificial intelligence that is constructed on a learning model based on a plurality of types of information in various aspects, such as image data, numerical data, text data, and audio data, and that derives a result based on the learning model.

The liver tumor risk determination unit 11 performs machine learning through the multimodal AI before the diagnosis of the subject 2 is performed. That is, the liver tumor risk determination unit 11 stores, as training data, a relationship between the analysis information and diagnosis result information, for each of a plurality of diagnoses or observations performed in the past on various subjects or phantoms, thereby constructing the learning model. This learning model may be a learning model from which the diagnosis result information for new analysis information obtained from the lesion/risk information analysis unit 10 can be obtained by providing the new analysis information.

The liver tumor risk determination unit 11 may use the learning model such as the multimodal AI, but may perform some determinations through a look-up table, operations, or the like. By extracting appropriate information from various types of information and then using the learning model that has learned these pieces of information, high-precision determination is achieved.

Further, the numerical information may be obtained through the look-up table that stores a result based on, for example, a statistical calculation result in advance, or an operation of performing statistical arithmetic calculation from numerical calculation such as subtraction, squaring, or integration. The prediction calculation or the like in continuous signal information may be performed by an RNN, an LSTM, or the like. In addition, the image analysis may be performed by a CNN or the like. High-precision analysis is performed by appropriately selecting respective learning models suitable for analysis and a combination of these.

The display controller 9 generates image data indicating an image of the determination result based on each ultrasound image data and each ultrasound measurement information output from the ultrasound information generation unit 5 and the determination result information output from the liver tumor risk determination unit 11. The display controller 9 generates a video signal based on the image data and outputs the video signal to the display unit 6. The display unit 6 may be a monitor composed of an organic EL display, a CRT display, a liquid crystal display, or the like. The display unit 6 displays the image showing the determination result based on the video signal.

Figure 12:
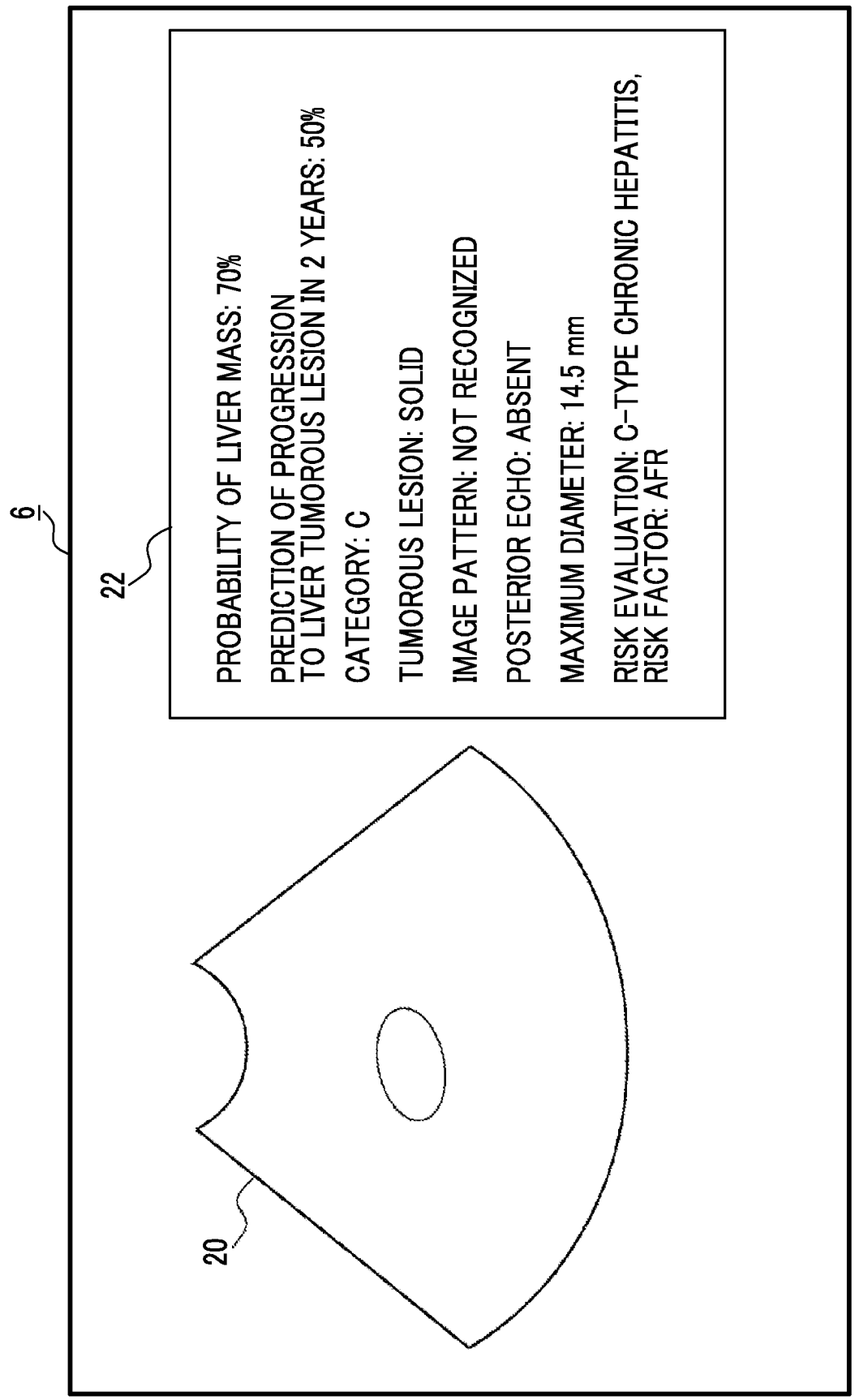
FIG. 12 is a diagram showing an example of an image displayed on a display unit.

FIG. 12 shows an example of the image displayed on the display unit 6. The display unit 6 shows a determination result 22 together with a B mode image 20. In the example shown in FIG. 12, the region where the lesion is recognized is indicated by a line drawing a substantially round shape, and the determination result 22 is displayed in text. The determination result is displayed as follows.

"Probability of liver mass: 70%", "Prediction of progression to liver tumorous lesion in 2 years: 50%", "Category: C", "Tumorous lesion: solid", "Image pattern: not recognized", "Posterior echo: absent", "Maximum diameter: 14.5 mm", "Risk evaluation: C-type chronic hepatitis, Risk factor: AFR".

The above-described embodiment shows a determination result useful for a doctor to diagnose a lesion. The ultrasound diagnostic apparatus 100 may select and display information particularly useful for diagnosis from among a large amount of ultrasound information. Although FIG. 12 shows an example of numerical notation in text, for example, an indicator such as a correlation graph or a color bar may be displayed.

Figure 13:
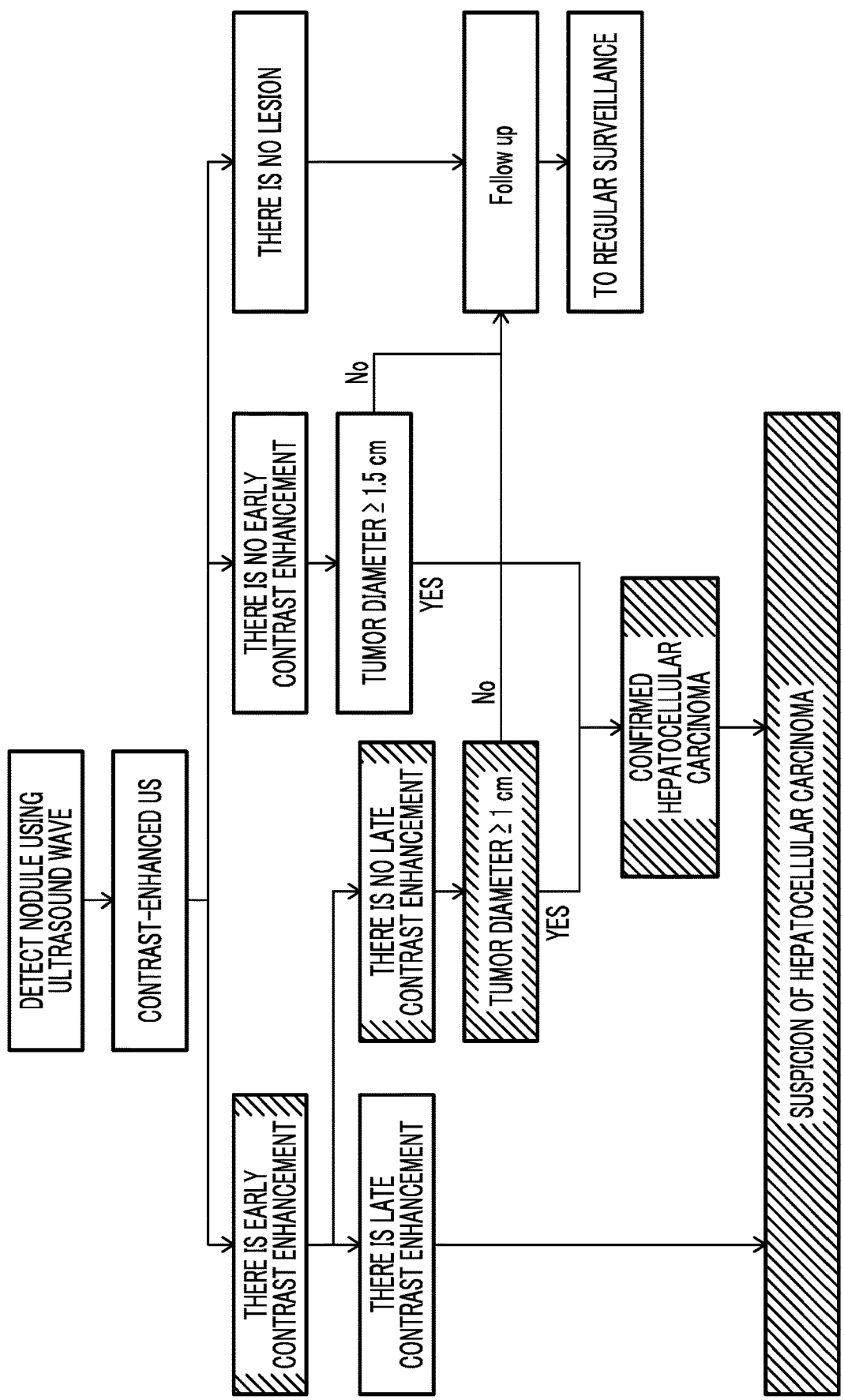
FIG. 13 is a diagram showing an example of a flowchart displayed on the display unit.
Figure 14:
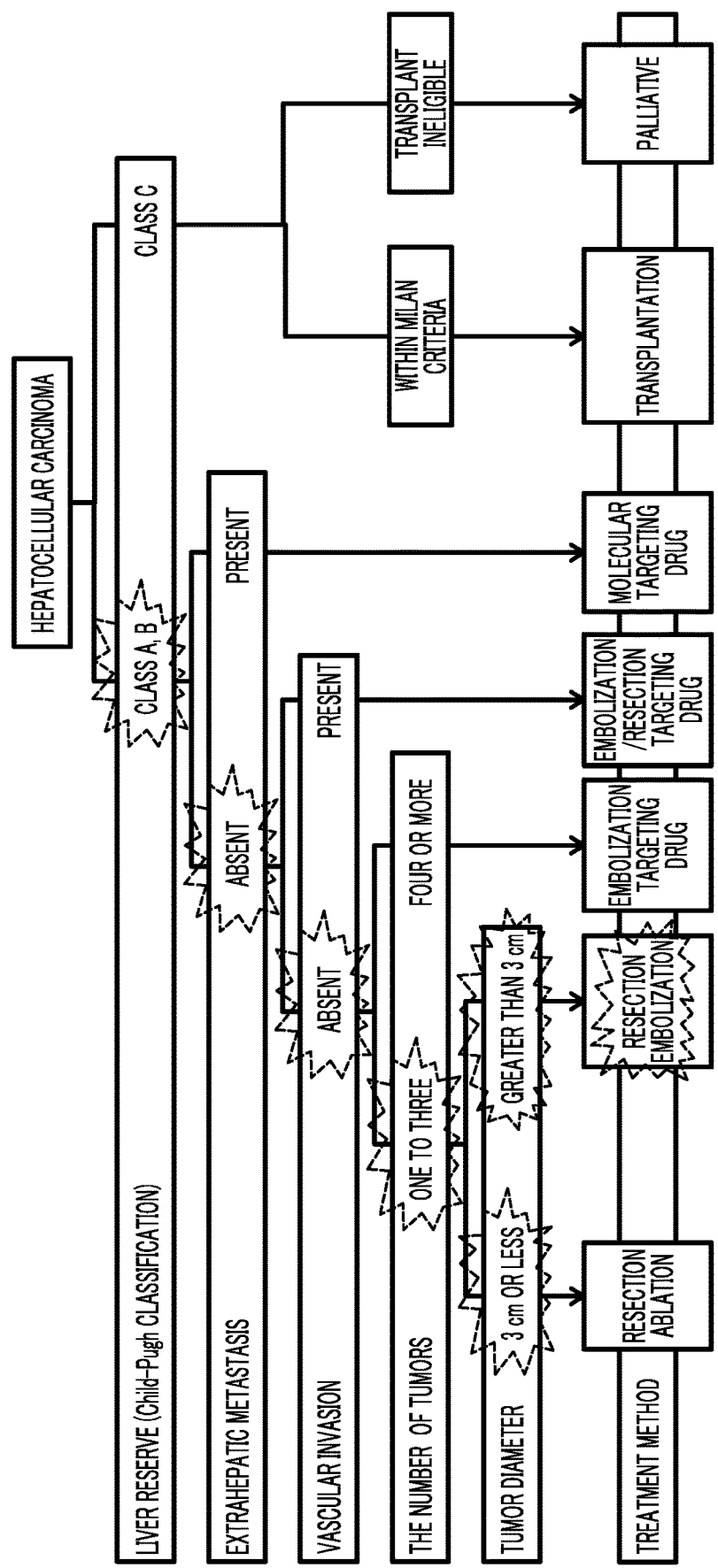
FIG. 14 is a diagram showing an example of a flowchart displayed on the display unit.

In addition, a flowchart for judgment based on the diagnostic guidance may be displayed, and relevant items and branching lines leading to the determination may be highlighted and displayed. This flowchart may be displayed by being overlaid with an ultrasound diagnostic image. FIG. 13 shows an example of a flowchart of hepatocellular carcinoma determination. In FIG. 13, each column for "there is early contrast enhancement", "there is no late contrast enhancement", "tumor diameter≥1 cm", "confirmed hepatocellular carcinoma", and "suspicion of hepatocellular carcinoma" is highlighted and displayed. FIG. 14 shows an example of a flowchart of hepatocellular carcinoma treatment determination. In FIG. 14, columns for "liver reserve", "extrahepatic metastasis", "vascular invasion", "the number of tumors", "tumor diameter", and "treatment method" are highlighted and displayed with the respective entries "class A, B", "absent", "absent", "one to three", "greater than 3 cm", and "resection embolization."

In addition, the ultrasound diagnostic apparatus 100 has an input function that allows changes in a category or a state of the lesion based on the doctor's judgment, and may re-process probability calculations, estimation calculations, or the like based on the category or the state of the lesion judged by the doctor and may correct the result.

As described above, the ultrasound diagnostic apparatus 100 according to the present embodiment comprises the ultrasound transmission and reception unit 4 that transmits and receives ultrasound waves to and from the subject 2 through the ultrasound probe 3 and generates the reception signal. In addition, the ultrasound diagnostic apparatus 100 comprises the ultrasound information generation unit 5 that generates a plurality of types of ultrasound information based on the reception signal. The ultrasound information includes the ultrasound image data and the ultrasound measurement information. The ultrasound measurement information may be numerical data. The ultrasound image data according to the present embodiment includes image data indicating a B-mode image, a THI image, a TE image, an SWE image, an ATT image, a CFI image, or a CHI image.

The ultrasound diagnostic apparatus 100 comprises the lesion detection unit 5-2 and the ultrasound measurement information generation unit 5-3 as a detection and measurement unit that detects and measures the lesion based on the plurality of types of ultrasound information. In addition, the ultrasound diagnostic apparatus 100 comprises the lesion/risk information analysis unit 10 as an analysis unit that analyzes a state of the lesion based on a measurement result obtained by the detection and measurement unit.

The detection and measurement unit may comprise at least one of a tumorous lesion detection and measurement unit that detects and measures the tumorous lesion, a fibrotic lesion detection and measurement unit that detects and measures the fibrotic lesion, a calcified lesion detection and measurement unit that detects and measures the calcified lesion, or a fatty liver detection and measurement unit that detects and measures the fatty liver.

Here, the tumorous lesion detection and measurement unit is composed of the tumorous lesion detection unit 5-2-1 and the tumorous lesion measurement unit 5-3-1. The fibrotic lesion detection and measurement unit is composed of the fibrotic lesion detection unit 5-2-2 and the fibrotic lesion measurement unit 5-3-2. The calcified lesion detection and measurement unit is composed of the calcified lesion detection unit 5-2-3 and the calcified lesion measurement unit 5-3-3. The fatty liver detection and measurement unit is composed of the fatty liver detection unit 5-2-4 and the fatty liver measurement unit 5-3-4. The detection and measurement unit detects and measures at least one of a precancerous lesion or a liver cancer as the lesion, and the analysis unit analyzes the state of at least one of the precancerous lesion or the liver cancer as the lesion.

The lesion/risk information analysis unit 10 as the analysis unit comprises a plurality of types of learning units that analyze the state of the lesion by applying a plurality of types of ultrasound image data to a learning model constructed in advance. As the plurality of types of learning units, there are the B learning unit 12-1-$k$, the THI learning unit 12-2-$k$, the TE learning unit 12-3-$k$, the SWE learning unit 12-4-$k$, the ATT learning unit 12-5-$k$, the CFI learning unit 12-6-$k$, and the CHI learning unit 12-7-1 ($k$=1 to 4).

The lesion/risk information analysis unit 10 as the analysis unit may output the analysis information by analyzing the state of the lesion based on at least one of a LUT calculation unit that analyzes the state of the lesion based on a look-up table acquired in advance, or a machine learning analysis unit that analyzes the state of the lesion based on a learning model constructed in advance. The LUT calculation unit includes the LUT calculation units 10-1-2 to 10-4-2, which are provided in the tumorous lesion analysis unit 10-1, the fibrotic lesion analysis unit 10-2, the calcified lesion analysis unit 10-3, and the fatty liver analysis unit 10-4, respectively. The machine learning analysis unit includes the tumorous lesion feature information learning unit 10-1-3, the fibrotic lesion feature information learning unit 10-2-3, the calcified lesion feature information learning unit 10-3-3, and the fatty liver feature information learning unit 10-4-3, which are provided in the tumorous lesion analysis unit 10-1, the fibrotic lesion analysis unit 10-2, the calcified lesion analysis unit 10-3, and the fatty liver analysis unit 10-4, respectively.

With the ultrasound diagnostic apparatus 100 according to the present embodiment, machine learning is performed before the diagnosis of the subject 2 is performed. That is, the relationship between the ultrasound information and the analysis information obtained for the ultrasound information is stored as training data for each of a plurality of diagnoses or observations performed in the past on various subjects or phantoms, and a learning model is constructed. In addition, the look-up table is created in advance based on statistics based on past diagnosis results, or the like.

The lesion/risk information analysis unit 10 outputs the analysis information by analyzing the state of the lesion based on at least one of a LUT calculation unit that analyzes the state of the lesion based on the look-up table, or a machine learning analysis unit that analyzes the state of the lesion based on the learning model. The liver tumor risk determination unit 11 generates the diagnosis result information based on the analysis information. This reduces the effort required to obtain the diagnosis result for the lesion and enhances the objectivity of the diagnosis result. In addition, the use of the look-up table reduces the amount of information to be processed as compared with a case of using only the machine learning analysis unit.

The lesion/risk information analysis unit 10 as the analysis unit may perform progression degree prediction of the lesion. The display controller 9 may display the progression degree prediction of the lesion on the display unit 6, or may display the progression degree prediction of the lesion and a cause leading to the prediction on the display unit 6.

The lesion/risk information analysis unit 10 as the analysis unit may perform determination on the treatment effect and further perform prediction on the treatment progress. The display controller 9 may display information obtained by performing determination on the treatment effect and further performing prediction on the treatment progress on the display unit 6, or may display, on the display unit 6, the information obtained by performing determination on the treatment effect and performing prediction on the treatment progress, and a cause leading to the determination of the treatment effect and to the prediction of the treatment progress.

In the above description, an embodiment has been described in which analysis is performed for the tumorous lesion, the fibrotic lesion, the calcified lesion, and the fatty liver. In a case where there is a medical determination item other than this, the analysis target is not limited thereto. For example, a mass lesion may be analyzed instead of the tumorous lesion or together with the tumorous lesion. In this case, the mass lesion may be detected by the lesion detection unit 5-2, measured by the ultrasound measurement information generation unit 5-3, and analyzed by the lesion/risk information analysis unit 10. In addition, for example, a learning model of the mammary gland may be used to determine whether or not a breast cancer has progressed from the ultrasound diagnostic image. In addition, a learning model of other biological tissues may be used to determine whether or not cancer has progressed in the biological tissues from the ultrasound diagnostic image.

Further, there are other medical guidelines for the liver tumor having no mass, and the like, and detection algorithms based on the medical guidelines may be used in the present disclosure. Furthermore, analysis may be performed based on any combination of the tumorous lesion, the fibrotic lesion, calcified lesion, and the fatty liver. For example, in a case of a high-density liver in which the liver tissue is well developed or in a case of distinguishing fatty livers, anisotropic information or ultrasound attenuation information obtained by texture analysis or the like are effective.

In the above description, it has been described that analysis is performed based on each ultrasound information with the configuration of the tumorous lesion analysis unit 10-1, the fibrotic lesion analysis unit 10-2, the calcified lesion analysis unit 10-3, the fatty liver analysis unit 10-4, and the patient affliction risk analysis unit 10-5 according to the embodiment of the present disclosure, but it is not necessary to use all of these analysis units and all of the ultrasound information. Depending on the state of the lesion, measurement, calculation, and analysis processing may be limited to a range in which analysis based on the ultrasound information that can provide sufficient determination can be conducted, and unnecessary processing may be halted, the weighting of the processing result may be changed, or the like, thereby streamlining and speeding up the determination processing. In addition, the ultrasound information to be used and the content of the processing used for determination may be changed based on the doctor's judgment.

Medical guidelines vary by country or region. Depending on the differences by country or region, rearranging the configurations or the techniques and changing the display contents, which can be implemented in the contents described in the present disclosure, are also included in the scope of the claims. Furthermore, medical guidelines are constantly evolving with new factors being added each year. In this case as well, a new ultrasound diagnosis mode and an ultrasound measurement technique may be implemented in the present disclosure.

For example, other image diagnostic apparatuses such as magnetic resonance imaging (MRI), and analyzers may be added to the present disclosure. This provides more judgment materials for the doctor, which results in increased diagnostic accuracy. Information generated by other image diagnostic apparatuses or analyzers may be incorporated into the ultrasound diagnostic apparatus 100 via electrical communication lines, such as the Internet.

Configuration of Present Disclosure

The present disclosure may have the following configurations.

Configuration 1:
An ultrasound diagnostic apparatus comprising:
an ultrasound transmission and reception unit that transmits and receives ultrasound waves to and from a subject and generates a reception signal;
an ultrasound information generation unit that generates a plurality of types of ultrasound information based on the reception signal;
a detection and measurement unit that detects and measures a lesion based on the plurality of types of ultrasound information; and
an analysis unit that analyzes a state of the lesion based on a measurement result obtained by the detection and measurement unit.

Configuration 2:
The ultrasound diagnostic apparatus according to Configuration 1,
in which the detection and measurement unit includes at least one of
a tumorous lesion detection and measurement unit that detects and measures a tumorous lesion,
a fibrotic lesion detection and measurement unit that detects and measures a fibrotic lesion,
a calcified lesion detection and measurement unit that detects and measures a calcified lesion, or
a fatty liver detection and measurement unit that detects and measures a fatty liver,
the detection and measurement unit
detects and measures at least one of a precancerous lesion or a liver cancer as the lesion, and
the analysis unit
analyzes a state of at least one of the precancerous lesion or the liver cancer as the lesion.

Configuration 3:
The ultrasound diagnostic apparatus according to Configuration 1 or 2,
in which the ultrasound information includes a plurality of types of ultrasound image data generated in different modes, and
the analysis unit
analyzes the state of the lesion by applying the plurality of types of ultrasound image data to a learning model constructed in advance.

Configuration 4:
The ultrasound diagnostic apparatus according to any one of Configurations 1 to 3,
in which the analysis unit
analyzes the state of the lesion based on at least one of a LUT calculation unit that analyzes the state of the lesion based on a look-up table acquired in advance, or a machine learning analysis unit that analyzes the state of the lesion based on a learning model constructed in advance.

Configuration 5:
The ultrasound diagnostic apparatus according to any one of Configurations 1 to 4,
in which the analysis unit
performs progression degree prediction of the lesion.

Configuration 6:
The ultrasound diagnostic apparatus according to Configuration 5, further comprising:
a display controller,
in which the display controller
displays the progression degree prediction of the lesion on a display unit, or
displays the progression degree prediction of the lesion and a cause leading to the prediction on the display unit.

Configuration 7:
The ultrasound diagnostic apparatus according to any one of Configurations 1 to 6,
in which the analysis unit
performs determination on a treatment effect and further performs prediction on a treatment progress.

Configuration 8:
The ultrasound diagnostic apparatus according to Configuration 7, further comprising:
a display controller,
in which the display controller
displays information obtained by performing determination on the treatment effect and further performing prediction on the treatment progress on a display unit, or
displays, on the display unit, the information obtained by performing determination on the treatment effect and performing prediction on the treatment progress, and a cause leading to the determination of the treatment effect and to the prediction of the treatment progress.

Configuration 9:
The ultrasound diagnostic apparatus according to any one of Configurations 1 to 8,
in which the ultrasound information
includes data indicating at least one of a B-mode image, a tissue harmonic image, a tissue elastography image, a share wave elastography image, an attenuation image, a color flow image, or a contrast-enhanced harmonic image.

What is claimed is:

1. An ultrasound diagnostic apparatus comprising:
an ultrasound transmission and reception unit configured to transmit and receive ultrasound waves to and from a subject and generate a reception signal; and
one or more processors configured to:
generate a plurality of types of ultrasound information based on the reception signal, the ultrasound information including a plurality of types of ultrasound image data generated in different modes;
detect and measure a lesion based on the plurality of types of ultrasound information, to obtain a measurement result; and
analyze a state of the lesion based on the measurement result and by applying the plurality of types of ultrasound image data generated in the different modes to a learning model constructed by machine learning in advance for the different modes, and generate analysis information estimating a prognosis of the lesion.

2. The ultrasound diagnostic apparatus according to claim 1,
wherein the one or more processors are further configured to perform at least one of
detect and measure a tumorous lesion,
detect and measure a fibrotic lesion,
detect and measure a calcified lesion, or
detect and measure a fatty liver, and
the one or more processors are further configured to detect and measure at least one of a precancerous lesion or a liver cancer as the lesion, and to analyze a state of at least one of the precancerous lesion or the liver cancer as the lesion.

3. The ultrasound diagnostic apparatus according to claim 1,
wherein the one or more processors are further configured to analyze the state of the lesion based on a look-up table acquired in advance.

4. The ultrasound diagnostic apparatus according to claim 1,
wherein the ultrasound information includes data indicating at least one of a B-mode image, a tissue harmonic image, a tissue elastography image, a share wave elastography image, an attenuation image, a color flow image, or a contrast-enhanced harmonic image.

5. The ultrasound diagnostic apparatus according to claim 1, wherein the one or more processors are further configured to generate progression degree prediction information regarding a progression degree prediction of lesion, by comprehensively judging the analysis information regarding one or more pieces of lesion information and a patient's medical information, by using multimodal artificial intelligence (AI).

6. The ultrasound diagnostic apparatus according to claim 1, wherein
the one or more processors are further configured to generate progression degree prediction information regarding a progression degree prediction of lesion, by using (a) a look-up table that stores a result based on a statistical calculation result, (b) a statistical arithmetic calculation, (c) a second learning model constructed for analysis processing or prediction processing, or (d) any combination of the look-up table, the statistical arithmetic calculation, and the second learning model,
the analysis processing includes a convolutional neural network (CNN), and
the prediction processing includes a recurrent neural network (RNN) or a long short term memory (LSTM).

7. The ultrasound diagnostic apparatus according to claim 1, wherein the one or more processors are further configured to determine a treatment effect and predict a treatment progress, by comprehensively judging the analysis information regarding one or more pieces of lesion information and a patient's medical information, by using multimodal artificial intelligence (AI).

8. The ultrasound diagnostic apparatus according to claim 1,
wherein the one or more processors are further configured to perform progression degree prediction of the lesion.

9. The ultrasound diagnostic apparatus according to claim 8, wherein the one or more processors are further configured to display the progression degree prediction of the lesion on a display unit, or to display the progression degree prediction of the lesion and a cause leading to the prediction, on the display unit.

10. The ultrasound diagnostic apparatus according to claim 1,
wherein the one or more processors are further configured to perform determination on a treatment effect and to perform prediction on a treatment progress.

11. The ultrasound diagnostic apparatus according to claim 10, wherein the one or more processors are further configured to display information obtained by performing determination on the treatment effect and to perform prediction on the treatment progress, on a display unit, or to display, on the display unit, the information obtained by performing determination on the treatment effect and performing prediction on the treatment progress, and a cause leading to the determination of the treatment effect and to the prediction of the treatment progress.

12. The ultrasound diagnostic apparatus according to claim 10, wherein
the one or more processors are further configured to generate progression degree prediction information regarding a progression degree prediction of lesion by using (a) a look-up table that stores a result based on a statistical calculation result, (b) a statistical arithmetic calculation, (c) a second learning model constructed for analysis processing or prediction processing, or (d) any combination of the look-up table, the statistical arithmetic calculation, and the second learning model,
the analysis processing includes a convolutional neural network (CNN), and
the prediction processing includes a recurrent neural network (RNN) or a long short term memory (LSTM).

* * * * *